United States Patent
Shiba et al.

(10) Patent No.: US 8,045,301 B2
(45) Date of Patent: Oct. 25, 2011

(54) MOTOR DRIVE DEVICE

(75) Inventors: Kenjiro Shiba, Toyota (JP); Takashi Tanaka, Okazaki (JP); Nobutaka Tanaka, Nagoya (JP)

(73) Assignee: Toyota Jidosha Kabushiki Kaisha, Aichi-Ken (JP)

( * ) Notice: Subject to any disclaimer, the term of this patent is extended or adjusted under 35 U.S.C. 154(b) by 459 days.

(21) Appl. No.: 12/306,180

(22) PCT Filed: Jun. 28, 2007

(86) PCT No.: PCT/JP2007/063416
§ 371 (c)(1),
(2), (4) Date: Dec. 22, 2008

(87) PCT Pub. No.: WO2008/001949
PCT Pub. Date: Jan. 3, 2008

(65) Prior Publication Data
US 2009/0251831 A1 Oct. 8, 2009

(30) Foreign Application Priority Data
Jun. 30, 2006 (JP) ................................. 2006-181833

(51) Int. Cl.
H02H 7/08 (2006.01)
H02H 9/00 (2006.01)
(52) U.S. Cl. .......... 361/23; 363/55; 363/56.04; 318/800
(58) Field of Classification Search .................. 318/701, 318/706, 707, 800, 430, 432, 700; 361/23, 361/30, 31, 1; 363/50, 52, 53, 55, 56.01, 363/56.02, 56.03, 56.04; 180/65.265, 65.275; 290/40 C
See application file for complete search history.

(56) References Cited

U.S. PATENT DOCUMENTS

| | | | | |
|---|---|---|---|---|
| 4,896,089 A | * | 1/1990 | Kliman et al. | 318/701 |
| 5,448,442 A | * | 9/1995 | Farag | 361/24 |
| 5,677,611 A | | 10/1997 | Yoshihara et al. | |
| 5,694,010 A | | 12/1997 | Oomura et al. | |
| 5,708,576 A | * | 1/1998 | Jones et al. | 363/56.03 |

(Continued)

FOREIGN PATENT DOCUMENTS
JP 02299498 A * 12/1990
(Continued)

OTHER PUBLICATIONS
Japanese Notice of Grounds of Rejection, issued in corresponding Japanese Application No. 2006-181833, dated Jun. 1, 2010.
(Continued)

*Primary Examiner* — Eduardo Colon Santana
(74) *Attorney, Agent, or Firm* — Sughrue Mion, PLLC

(57) ABSTRACT

When an upper arm of U-phase has failed because of short-circuit, lower arms of V-phase and W-phase as the opposite arms are switching-operated. When only the lower arm of V-phase is turned on, a route of motor current passing through an IGBT element from a V-phase coil is formed, and therefore, the motor current returning to the short-circuited phase decreases. Further, by the switching operation of the arm opposite to the short-circuited arm, an AC current is induced in a motor generator. Therefore, it is possible to continuously drive the motor generator while preventing increase in the current passing through the short-circuited phase, without adding a new device structure. This ensures running of the vehicle in the limp mode.

10 Claims, 19 Drawing Sheets

U.S. PATENT DOCUMENTS

| | | | |
|---|---|---|---|
| 6,563,230 B2 | 5/2003 | Nada | |
| 6,784,563 B2 | 8/2004 | Nada | |
| 7,095,206 B2 * | 8/2006 | Lequesne et al. | 318/254.1 |
| 7,372,676 B2 * | 5/2008 | Cullen et al. | 361/31 |
| 7,733,616 B2 * | 6/2010 | Yamada | 361/31 |
| 2001/0048226 A1 | 12/2001 | Nada | |
| 2009/0009920 A1 * | 1/2009 | Yamada | 361/93.1 |
| 2009/0195199 A1 * | 8/2009 | Ito | 318/400.22 |
| 2010/0036555 A1 * | 2/2010 | Hosoda et al. | 701/22 |
| 2010/0060222 A1 * | 3/2010 | Kezobo et al. | 318/490 |
| 2010/0263953 A1 * | 10/2010 | Shimana | 180/65.285 |
| 2011/0043152 A1 * | 2/2011 | Kidokoro et al. | 318/490 |
| 2011/0074333 A1 * | 3/2011 | Suzuki | 318/724 |
| 2011/0140526 A1 * | 6/2011 | Weidenheimer et al. | 307/71 |

FOREIGN PATENT DOCUMENTS

| | | | |
|---|---|---|---|
| JP | 07-250482 A | | 9/1995 |
| JP | 08-066081 A | | 3/1996 |
| JP | 08-080056 A | | 3/1996 |
| JP | 08-186984 A | | 7/1996 |
| JP | 09-023501 A | | 1/1997 |
| JP | 09-191654 A | | 7/1997 |
| JP | 10-094269 A | | 4/1998 |
| JP | 11-008992 A | | 1/1999 |
| JP | 11089003 A | * | 3/1999 |
| JP | 11-332002 A | | 11/1999 |
| JP | 2000-116180 A | | 4/2000 |
| JP | 2001-320806 A | | 11/2001 |
| JP | 2001-329884 A | | 11/2001 |
| JP | 2004-120883 A | | 4/2004 |
| JP | 2005-102443 A | | 4/2005 |
| JP | 2005-153570 A | | 6/2005 |

OTHER PUBLICATIONS

German Office Action for corresponding Application No. 11 2007 001 594.2, dated Jul. 8, 2011.

Bianchi et al., "Influence of the Current Control Strategy on the PMSM Drive Performance During Failures," 2011, pp. 1.330-1.335, University of Padova, Italy.

* cited by examiner

FIG.17

| INTER-PHASE VOLTAGE | VOLTAGE WAVEFORM PATTERN | | | | | |
|---|---|---|---|---|---|---|
| Vvu (BETWEEN U- AND V-PHASES) | [1] | [1] | [2] | [3] | [3] | [2] |
| Vwv (BETWEEN V- AND W-PHASES) | [2] | [3] | [3] | [2] | [1] | [1] |
| Vwu (BETWEEN W- AND U-PHASES) | [3] | [2] | [1] | [1] | [2] | [3] |
| SHORT-CIRCUITED PHASE | W-PHASE | W-PHASE | V-PHASE | V-PHASE | U-PHASE | U-PHASE |
| SHORT-CIRCUITED ARM | UPPER | LOWER | UPPER | LOWER | UPPER | LOWER |

FIG.19

| INTER-PHASE VOLTAGE | VOLTAGE WAVEFORM PATTERN | | | | | | | |
|---|---|---|---|---|---|---|---|---|
| Vvu | [2] | [3] | [6] | [5] | [4] | [5] | [6] | [6] |
| Vwv | [4] | [2] | [5] | [5] | [3] | [6] | [6] | [5] |
| Vwu | [3] | [4] | [6] | [6] | [2] | [5] | [5] | [5] |
| SHORT-CIRCUITED PHASE | W,V | W,U | W,V | W,U | V,U | W,V | V,U | W,U |
| SHORT-CIRCUITED ARM | UPPER, UPPER | UPPER, UPPER | UPPER, LOWER | UPPER, LOWER | UPPER, UPPER | LOWER, UPPER | UPPER, LOWER | LOWER, UPPER |

FIG.20

| INTER-PHASE VOLTAGE | VOLTAGE WAVEFORM PATTERN | | | | | | |
|---|---|---|---|---|---|---|---|
| Vvu | [4] | [5] | [4] | [4] | [5] | [6] | [4] |
| Vwv | [4] | [4] | [5] | [6] | [6] | [4] | [4] |
| Vwu | [4] | [6] | [6] | [5] | [4] | [5] | [4] |
| SHORT-CIRCUITED PHASE | W,V,U | W,V,U | W,V,U | W,V,U | W,V,U | W,V,U | W,V,U |
| SHORT-CIRCUITED ARM | UPPER, UPPER, UPPER | UPPER, UPPER, LOWER | UPPER, LOWER, LOWER | LOWER, UPPER, UPPER | LOWER, UPPER, LOWER | LOWER, LOWER, UPPER | LOWER, LOWER, LOWER |

MOTOR DRIVE DEVICE

TECHNICAL FIELD

The present invention relates to a motor drive device and, more specifically, to a motor drive device allowing continuous operation of the motor when a driving circuit controlling driving of the motor is failed by a short-circuit.

BACKGROUND ART

Recently, a hybrid vehicle and an electric vehicle are attracting attention as ecologically friendly vehicles. A hybrid vehicle has, as power sources, a DC power source, an inverter and a motor driven by the inverter, in addition to a conventional engine. Specifically, power is obtained by driving the engine and, in addition, the DC voltage from the DC power source is converted to AC voltage by the inverter, the motor is rotated by the converted AC voltage, and whereby power is obtained.

An electric vehicle has a DC power source, an inverter and a motor driven by the inverter, as power sources.

In a motor drive device mounted on a hybrid vehicle or an electric vehicle as such, typically, when a malfunction such as short-circuit of a switching element forming the inverter is detected, the inverter operation is stopped, in order to prevent excessive heating of the switching element caused by an excessive current flowing to the short-circuited switching element.

At this time, a back electromotive force generates in a motor coupled to the drive shaft of the vehicle in accordance with the speed of rotation. Therefore, when the motor speed is high, a current passing through the inverter may undesirably increase, as it receives high back electromotive force. Therefore, in some type of vehicles, in response to a detection of inverter malfunction, a clutch arranged between the drive shaft and the motor is disconnected, to stop power transmission from the drive shaft to the motor, and the vehicle enters a so-called limp mode, in which the vehicle runs to a place not to block foot or vehicle traffic, with the clutch disconnected.

At this time, the limp mode running depends only on the inertia acting on the driving wheels, as the power is not supplied to the drive shaft. Therefore, it is difficult to secure a running distance to reliably move the vehicle to a safe area.

In view of the foregoing, recently, a technique has been proposed for ensuring torque necessary for the limp mode running. For example, Japanese Patent Laying-Open No. 2004-120883 discloses an inverter for driving a three-phase AC motor in which an operation of a three-phase AC motor can be continued even if a switching element forming the inverter fails.

According to this laid-open application, the inverter for driving three-phase AC motor includes a DC power supply circuit with a rectifying circuit rectifying an output of an AC power supply, an inverter circuit formed by first to third arm circuits connected in parallel, each including two semiconductor switching elements connected in series and converting a DC voltage from the DC power supply to a three-phase AC voltage, and a PWM controller for PWM (Pulse Width Modulation) control of the inverter circuit, and drives a three-phase AC motor having star-connected excitation windings of three-phases.

In the inverter, the DC power supply circuit has a voltage dividing circuit equally dividing the output voltage of the rectifying circuit and outputting to a neutral point, and the first to third arm circuits have first to third output points formed by a node of two semiconductor switching elements. Between the neutral point and the first to third output points, a neutral point connecting switch circuit is provided, for selectively connecting the neutral point to any one of the first to third output points.

In the structure described above, if any of the plurality of semiconductor switching elements forming the inverter circuit is found defective, the neutral point connection switch circuit connects the neutral point and the output point of the arm circuit including the failed semiconductor switching element. As a result, the excitation windings of three-phase AC motor attain to a state equivalent to a state in which normal two-phase excitation windings are V-connected. In this state, the PWM controller performs PWM-control of four semiconductor switching elements included in two arm circuits regulating the current flowing through the V-connected two-phase excitation windings, and generates an output current of three-phase equilibrium, for driving the AC motor.

Further, Japanese Patent Laying-Open No. 9-23501 discloses an electric vehicle controller in which a failure diagnosis circuit as auxiliary motor control means is used for executing motor drive control in place of a motor control circuit, if a defect is found in any of three current sensors detecting currents flowing through respective phases of a three-phase motor or in a current control circuit executing feedback control based on the detected current from the current sensors.

According to this technique, as the failure diagnosis circuit as the spare motor drive control means, a back-up microcomputer is provided, separate from a microcomputer functioning as the original motor control circuit.

According to the inverter for driving three-phase AC motor disclosed in Japanese Patent Laying-Open No. 2004-120883, in order to continue operation of the three-phase AC motor even after the failure of a semiconductor switching element is found, a neutral point connection switching circuit becomes necessary, for connecting the output point of the arm circuit including the short-circuited semiconductor switching element to the neutral point of the DC power supply circuit. This inevitably leads to larger size of the inverter. Further, it leads to increased cost of the device.

Further, in the electric vehicle controller in accordance with Japanese Patent Laying-Open No. 9-23501, control circuits are provided corresponding to the normal state and abnormal state of the current sensor. Therefore, as in the technique of Japanese Patent Laying-Open No. 2004-120883, it involves the problems of the size and cost of the device. Other patent documents do not disclose any measure to control driving of a short-circuited inverter only by an existing device structure.

The present invention was made to solve these problems and its object is to provide a motor drive device that can ensure safety and output performance of a motor when a failure of an inverter is detected, with a simple and inexpensive device structure.

DISCLOSURE OF THE INVENTION

The present invention provides a motor drive device, including: a three-phase AC motor; a power source capable of supplying DC power to first and second power supply lines; a power converting device performing power conversion between the first and second power lines and the three-phase AC motor; and a controller controlling the power converting device such that an output of the three-phase AC motor attains to a target output. The power converting device includes first to third circuits connected to coils of first to third phases, respectively, of the three-phase AC motor. Each of the first to third circuits has first and second switching elements connected in series, through a connection node to the coil of respective phase of the three-phase AC motor. The controller includes a short-circuit detecting unit detecting a switching element failed because of short-circuit, from the first to third circuits, and a motor drive control unit controlling, in response to detection of a short-circuited switching element by the short-circuit detecting unit, currents flowing through coils of respective phases of the three-phase AC motor, by a switching operation of at least one switching element arranged opposite to the short-circuited switching element with the connection node interposed.

In the motor drive device described above, when short-circuit of switching element occurs in one or two of the first to third circuits, a switching element belonging to a normal circuit not including the failed switching element and forming an arm different from the arm constituted by the corresponding switching element is caused to perform a switching operation, whereby increase of the current passing through the circuit failed by the short-circuit is suppressed and the three-phase AC motor can be driven continuously. Therefore, motor safety and output performance can both be realized simply by the existing device structure, without newly adding the neutral point connection switching circuit or auxiliary motor control means that has been conventionally provided to address short-circuit failure.

Preferably, the motor drive control unit controls, in response to detection of a short-circuit failure of the first switching element of the first circuit, currents flowing through coils of respective phases of the three-phase AC motor by a switching operation of the second switching element of the second and third circuits.

In the motor drive device described above, when short-circuit occurs in a switching element forming any of the first to third circuits, the switching elements forming the remaining two normal circuits are caused to perform the switching operation, whereby increase of the current passing through the normal circuits is suppressed and the three-phase AC motor can be driven continuously.

Preferably, the short-circuit detecting unit detects the short-circuited switching element, based on amplitude of currents flowing through coils of respective phases of the three-phase AC motor.

More preferably, the short-circuit detecting unit determines that the first switching element of the first circuit is short-circuited, in response to a current flowing through the coil of the first phase of the three-phase AC motor being offset exceeding amplitude of a steady operation of the three-phase AC motor in a direction of a first polarity.

In the motor drive device described above, it is possible to easily identify a single switching element that failed because of short-circuit, from a total of six switching elements. As a result, it is possible to easily select a switching element to be switched and to continue driving of the three-phase AC motor.

Preferably, the motor drive control unit controls, in response to detection of a short-circuit failure of the first switching element of each of the first and second circuits, currents flowing through coils of respective phases of the three-phase AC motor by a switching operation of the second switching element of the third circuit.

Preferably, the motor drive control unit controls, in response to detection of a short-circuit failure of the first switching element of the first circuit and of the second switching element of the second circuit, currents flowing through coils of respective phases of the three-phase AC motor by a switching operation of the first and second switching elements of the third circuit.

In the motor drive device described above, when a short-circuit occurs in switching elements forming two of the first to third circuits, the switching element forming the remaining normal one circuit is switched, whereby increase of the current passing through the normal circuit is suppressed and the three-phase AC motor can be driven continuously. Therefore, the motor output characteristic at the time of short-circuit failure can further be improved.

Preferably, the short-circuit detecting unit detects the short-circuited switching element based on amplitude of an inter-phase voltage of the three-phase AC motor.

More preferably, the short-circuit detecting unit holds prescribed upper and lower threshold values set in advance based on the amplitude of the inter-phase voltage of the three-phase AC motor in the steady operation state, and detects the short-circuited switching element based on a magnitude relation between the amplitude of the inter-phase voltage of the three-phase AC motor and the upper and lower threshold values.

In the motor drive device described above, it is possible to easily identify at most six switching elements failed by short-circuit. As a result, it is possible to easily select a switching element to be switching-operated, and to continue driving of the three-phase AC motor.

Preferably, the short-circuit detecting unit detects the short-circuited switching element, based on a voltage between terminals of the first and second switching elements forming each of the first to third circuits.

In the motor drive device described above, it is possible to easily identify at most six switching elements failed by short-circuit. As a result, it is possible to easily select a switching element to be switching-operated, and to continue driving of the three-phase AC motor.

Preferably, the three-phase AC motor is coupled to a drive shaft of a vehicle.

In the motor drive device described above, even when a switching element forming the driving circuit fails because of short-circuit, it is possible to continuously drive the three-phase AC motor simply by the existing device structure and to ensure running of the vehicle in the limp mode. As a result, a highly reliable vehicle can be realized in a simple and inexpensive manner.

According to the present invention, motor safety and output performance can be ensured when a malfunction of the inverter is detected, with a simple and inexpensive device structure. As a result, it is possible in the vehicle mounting the motor drive device in accordance with the present invention to maintain running performance in the limp mode and to attain higher reliability, in a simple and inexpensive manner.

BRIEF DESCRIPTION OF THE DRAWINGS

FIG. 17 shows relations between the waveform patterns of inter-phase voltages of the motor generator, the short-circuited phase and short-circuited arm.

FIG. 19 shows relations between the waveform patterns of inter-phase voltages of the motor generator, the short-circuited phase and short-circuited arm.

FIG. 20 shows relations between the waveform patterns of inter-phase voltages of the motor generator, the short-circuited phase and short-circuited arm.

BEST MODES FOR CARRYING OUT THE INVENTION

Figure 1:
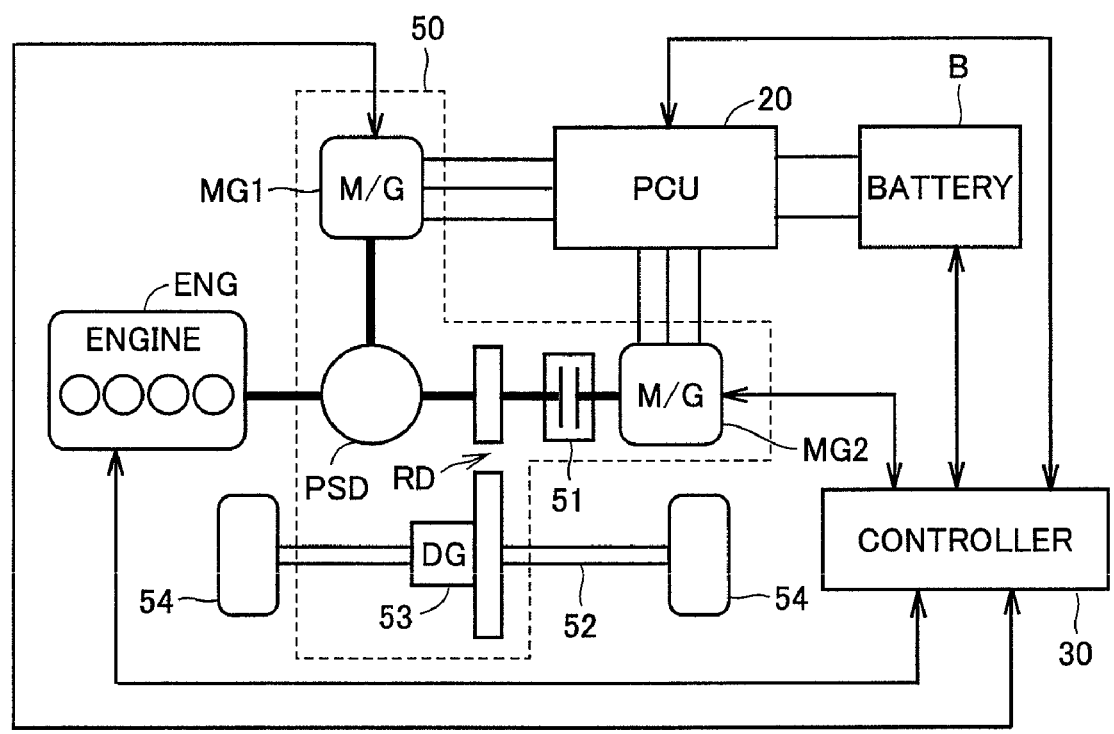
FIG. 1 is a block diagram showing a configuration related to motor generator control of the vehicle in accordance with Embodiment 1 of the present invention.

In the following, embodiments of the present invention will be described in detail with reference to the figures. In the figures, the same reference characters denote the same or corresponding portions.

Embodiment 1

FIG. 1 is a block diagram showing a configuration related to motor generator control of the vehicle in accordance with Embodiment 1 of the present invention.

Referring to FIG. 1, the vehicle includes an engine ENG, a battery B, a trans axle 50, a power control unit (PCU) 20 controlling motor generators MG1 and MG2, a drive shaft 52, wheels 54, and a controller 30.

Engine ENG generates driving force using combustion energy of fuel such as gasoline as a source. Battery B supplies electric power to power control unit 20. Battery B is formed of a rechargeable secondary battery and, typically, a nickel hydride battery, a lithium ion battery, or a large capacity capacitor is used.

Trans axle 50 has a transmission and an axle as an integrated structure, and has a power split device PSD, a reduction device RD, a differential gear (DG) 53, motor generators MG1 and MG2, and a clutch 51.

Power control unit 20 converts the DC power supplied from battery B to AC power and outputs it to motor generator MG2. Alternatively, power control unit 20 converts AC power supplied from motor generators MG1 and MG2 to DC power and outputs it to battery B.

Power split device PSD is capable of splitting the driving force generated by engine ENG to a route transmitting the force through reduction device RD and DG53 to drive shaft 52 for driving wheels 54, and to a route transmitting the force to motor generator MG1.

Each of motor generators MG1 and MG2 can function as a generator and as an electric motor. Motor generator MG1, however, mostly operates as a generator and, therefore, it is often called a "generator." Motor generator MG2 mainly operates as an electric motor and, therefore, it is sometimes called an "electric motor".

Motor generator MG1 is rotated by the driving force from engine ENG transmitted through power split device PSD, and generates electric power. The electric power generated by motor generator MG1 is supplied to power control unit 20, and used as electric power for charging battery B or as electric power for driving motor generator MG2.

Motor generator MG2 is driven to rotate by the AC power supplied from power control unit 20. The driving force generated by motor generator MG2 is transmitted through clutch 51, reduction device RD and DG 53 to drive shaft 52. Clutch 51 is implemented by a hydraulic clutch, an electromagnetic clutch or the like, and it transmits the output torque of motor generator MG2 through reduction device RD and DG 53 to wheels 54 with a torque transmission ratio in accordance with a control command from controller 30.

If motor generator MG2 is rotated while the wheels 54 are decelerated at the time of regenerative braking, the electromotive force (AC power) generated in motor generator MG2 is supplied to power control unit 20. In that case, power control unit 20 converts the supplied AC power to DC power and outputs it to battery B, whereby battery B is charged.

Figure 2:
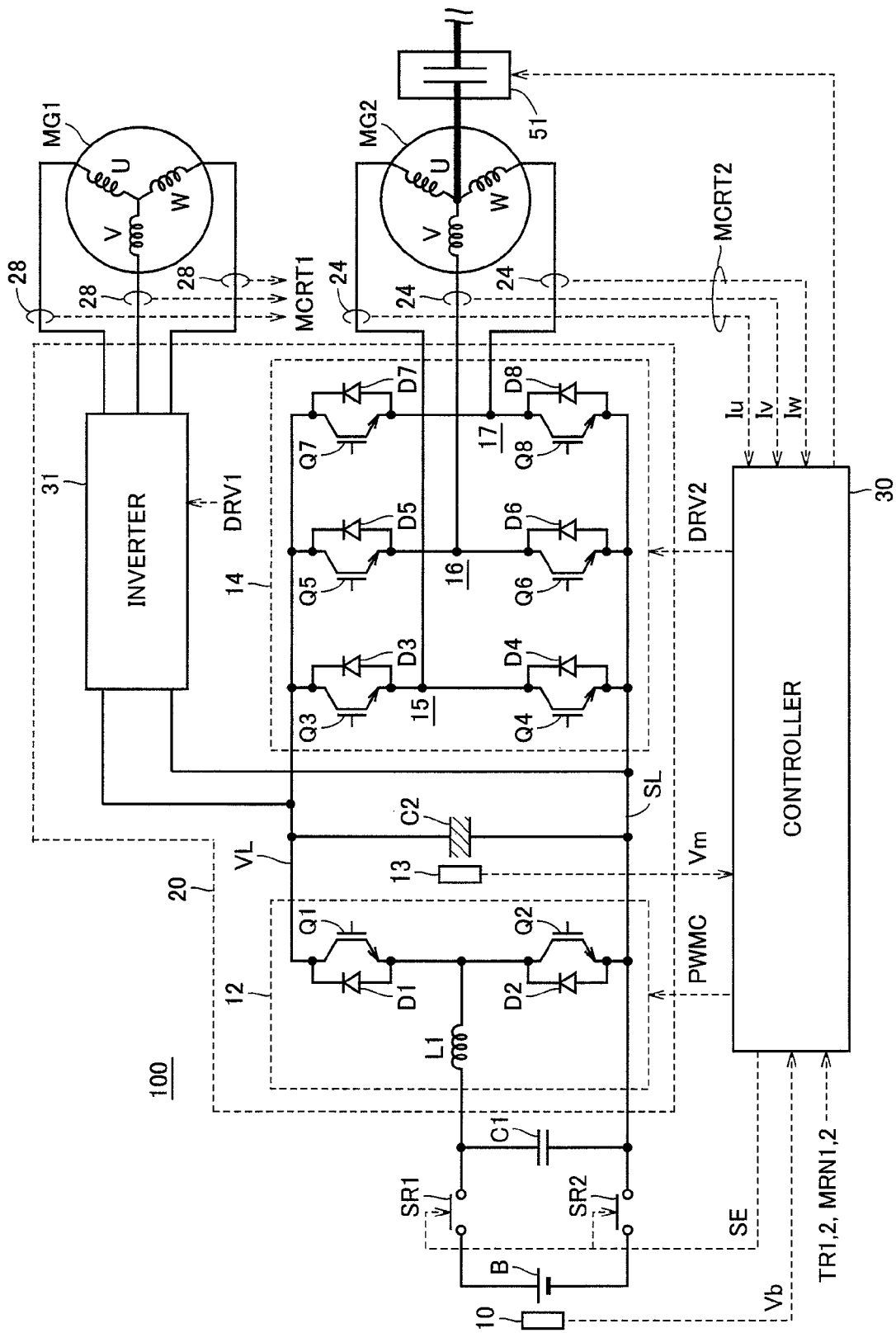
FIG. 2 is a schematic circuit diagram of a motor drive device in accordance with Embodiment 1 of the present invention.

FIG. 2 is a schematic circuit diagram of a motor drive device in accordance with the present embodiment.

Referring to FIG. 2, a motor drive device 100 includes battery B, voltage sensors 10 and 13, system relays SR1 and SR2, capacitors C1 and C2, a boosting converter 12, inverters 14 and 31, current sensors 24 and 28, and controller 30. In FIG. 2, inverters 14 and 31 provided corresponding to motor generators MG1 and MG2, respectively, and boosting converter 12 provided common to inverters 14 and 31 constitute power control unit 20 shown in FIG. 1.

Motor generators MG1 and MG2 are formed of three-phase AC synchronous motors, which are driven by electric power stored in battery B and the driving force of engine ENG. Motor generator MG2 is a driving motor for generating torque for driving the driving wheels of the vehicle. Motor generator MG1 is a motor having a function of a generator driven by engine ENG, and it operates as an electric motor for engine ENG and is capable of starting an operation of engine ENG.

Boosting converter 12 includes a reactor L1, IGBT (Insulated Gate Bipolar Transistor) elements Q1 and Q2, and diodes D1 and D2.

Reactor L1 has one end connected to a power line of battery B, and the other end connected to a midpoint between IGBT elements Q1 and Q2, that is, connected between the emitter of IGBT element Q1 and the collector of IGBT element Q2.

IGBT elements Q1 and Q2 are connected in series between power supply line VL and a ground line SL. IGBT element Q1 has its collector connected to power supply line VL, and IGBT element Q2 has its emitter connected to the ground line SL. Further, between the collector and emitter of IGBT elements Q1 and Q2, diodes D1 and D2 for causing current flow from the emitter side to the collector side are arranged, respectively.

Inverter 14 converts DC voltage output from boosting converter 12 to three phase AC and outputs it to motor generator MG2 driving wheels 54. Further, inverter 14 returns power generated by motor generator MG2 in regenerative braking to boosting converter 12. At this time, boosting converter 12 is controlled by controller 30 such that it operates as a voltage lowering circuit.

Inverter 14 includes a U-phase 15, a V-phase 16 and a W-phase 17. U-phase 15, V-phase 16 and W-phase 17 are provided in parallel between the power supply line VL and the ground line SL.

U-phase 15 includes series-connected IGBT elements Q3 and Q4. V-phase 16 includes series-connected IGBT elements Q5 and Q6. W-phase 17 includes series-connected IGBT elements Q7 and Q8. Further, between the collector and the emitter of IGBT elements Q3 to Q8, diodes D3 to D8 causing current flow from the emitter side to the collector side are connected, respectively.

The midpoint of each phase is connected to an end of each phase of coils of respective phases of motor generator MG2. Specifically, motor generator MG2 is a three-phase permanent magnet motor, having three coils of U-, V- and W-phases commonly connected at one end to the midpoint. The U-phase coil has its the other end connected to the midpoint between IGBT elements Q3 and Q4, the V-phase coil has its the other end connected to the midpoint between IGBT elements Q5 and Q6, and W-phase coil has its the other end connected to the midpoint between IGBT elements Q7 and Q8. It is noted that the switching elements included in boosting converter 12 and inverter 14 are not limited to IGBT elements Q1 to Q8, and they may be formed of other power elements such as MOSFETs.

Current sensor 24 detects a current MCRT2 (Iu, Iv, Iw) flowing through motor generator MG2, and provides an output to controller 30.

Inverter 31 is connected to boosting converter 12, in parallel with inverter 14. Inverter 31 converts DC voltage output from boosting converter 12 to three-phase AC and outputs it to motor generator MG1. Receiving the boosted voltage from boosting converter 12, inverter 31 drives motor generator MG1 for starting, for example, an operation of engine ENG.

Further, inverter 31 returns the power generated by motor generator MG1 by rotation torque transmitted from a crankshaft of engine ENG to boosting converter 12. At this time, boosting converter 12 is controlled by controller 30 such that it operates as a voltage lowering circuit.

Though not shown, internal configuration of inverter 31 is the same as that of inverter 14, and detailed description thereof will not be repeated. Current sensor 28 detects a current MCRT1 flowing through motor generator MG1, and provides an output to controller 30.

As described with reference to FIG. 1, clutch 51 is arranged between the rotation shaft of motor generator MG2 and reduction device RD (not shown). Clutch 51 connects/disconnects the rotation shaft of motor generator MG2 to/from drive shaft 52, in accordance with a control command from controller 30.

Battery B is a rechargeable secondary battery of, for example, nickel hydride or lithium ion. In place of battery B, a rechargeable electric storage other than the secondary battery, such as a capacitor, may be used. Voltage sensor 10 detects DC voltage Vb output from battery B, and outputs the detected DC voltage Vb to controller 30.

System relays SR1 and SR2 are turned on/off in response to a signal SE from controller 30.

Capacitor C1 smoothes the DC voltage Vb supplied from battery B, and outputs the smoothed DC voltage Vb to boosting converter 12.

Boosting converter 12 boosts the DC voltage Vb supplied from battery B and supplies the boosted voltage to capacitor C2. More specifically, receiving a signal PWMC from controller 30, boosting converter 12 boosts the DC voltage in accordance with the time period in which IGBT element Q2 is kept on by the signal PWMC, and supplies the resulting voltage to capacitor C2.

Further, receiving the signal PWMC from controller 30, boosting converter 12 lowers the DC voltage supplied from inverter 14 (or 31) through capacitor C2 and charges battery B.

Capacitor C2 smoothes the DC voltage from boosting converter 12, and supplies the smoothed DC voltage to inverters 14 and 31. Voltage sensor 13 detects a voltage across opposite ends of capacitor C2, that is, the output voltage Vm of boosting converter 12 (which corresponds to the input voltage to inverters 14 and 31, same applies in the following), and outputs the detected output voltage Vm to controller 30.

When the DC voltage is supplied from capacitor C2, inverter 14 converts the DC voltage to AC voltage based on a single DRV2 from controller 30 and drives motor generator MG2. Consequently, motor generator MG2 is driven to generate the required torque designated by a torque command value TR2. Further, at the time of regenerative braking of a hybrid vehicle or an electric vehicle mounting the motor drive device 100, inverter 14 converts the AC voltage generated by motor generator MG2 to a DC voltage based on the signal DRV2 from controller 30, and supplies the converted DC voltage to boosting converter 12 through capacitor C2.

When the DC voltage is supplied from capacitor C2, inverter 31 converts the DC voltage to AC voltage based on a signal DRV1 from controller 30, and drives motor generator MG1. Consequently, motor generator MG1 is driven to generate the required torque designated by a torque command value TR1. Further, at the time of regenerative braking of a hybrid vehicle or an electric vehicle mounting the motor drive device 100, inverter 14 converts the AC voltage generated by motor generator MG1 to a DC voltage based on the signal DRV 1 from controller 30, and supplies the converted DC voltage to boosting converter 12 through capacitor C2.

The regenerative braking here includes braking with power regeneration in response to a foot brake operation by a driver driving the hybrid vehicle or the electric vehicle, as well as deceleration (or stopping of acceleration) while regenerating power by turning off the accelerator pedal during running while not operating the foot brake.

Controller 30 receives torque command values TR1 and TR2 and motor rotation numbers MRN1 and MRN2 from an external ECU (Electric Control Unit), output voltage Vm from voltage sensor 13, DC voltage Vb from voltage sensor 10, and motor currents MCRT1 and MCRT2 from current sensor 24. Then, controller 30 generates, based on the output voltage Vm, torque command value TR2 and motor current MCRT2, a signal DRV2 for switching control of IGBT elements Q3 to Q8 of inverter 14 when inverter 14 drives motor generator MG2, in the manner as will be described later, and outputs the generated signal DRV2 to inverter 14.

Further, controller 30 generates, based on the output voltage Vm, torque command value TR1 and motor current MCRT1, a signal DRV1 for switching control of IGBT elements Q3 to Q8 of inverter 31 when inverter 31 drives motor generator MG1, and outputs the generated signal DRV1 to inverter 31.

Further, controller 30 generates a signal PWMC for switching control of IGBT elements Q1 and Q2 of boosting converter 12 in the manner as will be described above, based on the DC voltage Vb, output voltage Vm, torque command value TR2 (or TR1) and motor rotation number MRN2 (or MRN1), when inverter 14 (or 31) drives motor generator MG2 (or MG1), and outputs the signal to boosting converter 12.

Further, controller 30 generates a signal SE for turning on/off the system relays SR1 and SR2, and outputs the signal to system relays SRI and SR2.

Figure 3:
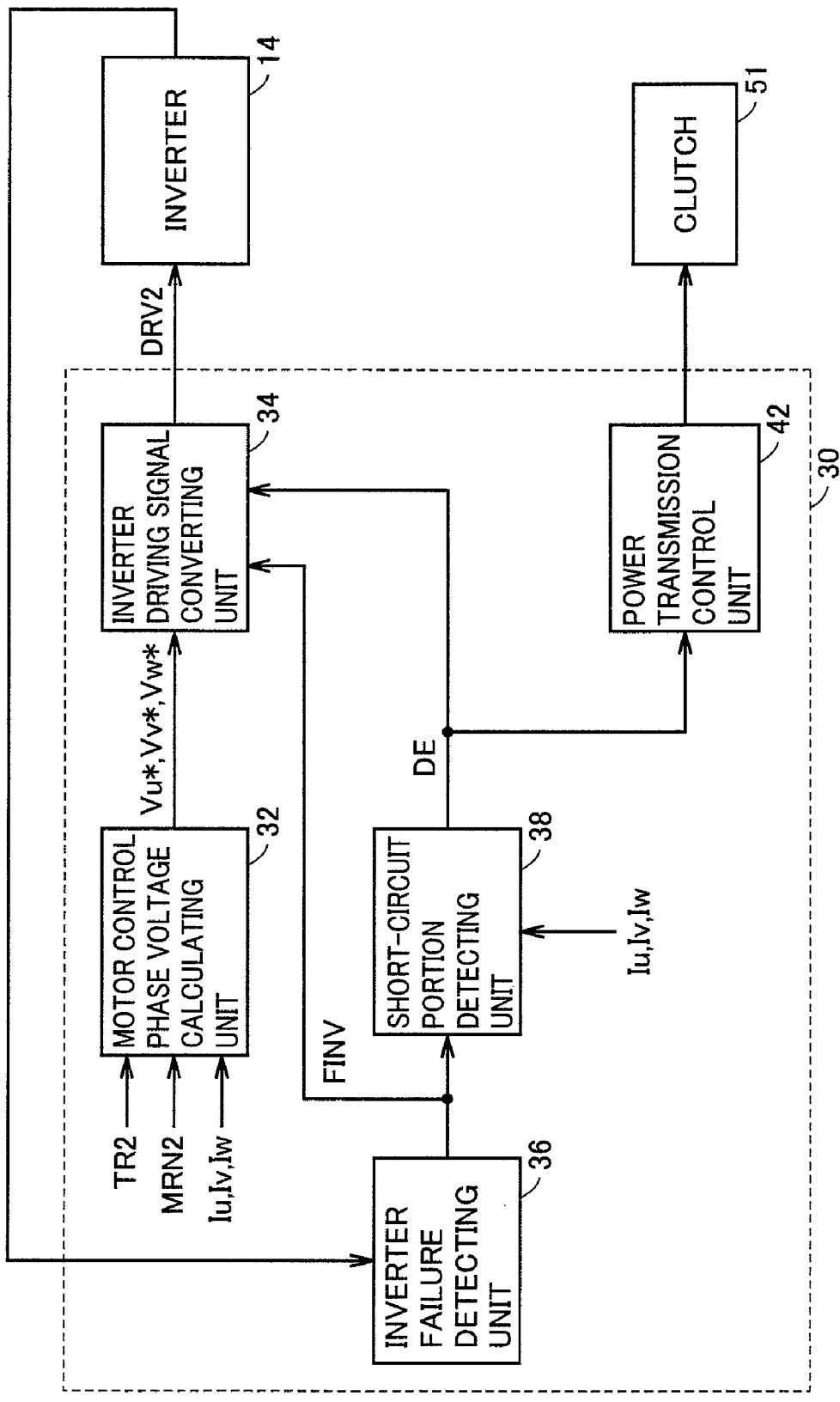
FIG. 3 is a functional block diagram of the controller shown in FIG. 2.

FIG. 3 is a functional block diagram of controller 30 shown in FIG. 2.

Referring to FIG. 3, controller 30 includes, as control means for inverter 14, a motor control phase voltage calculating unit 32, an inverter driving signal converting unit 34, an inverter failure detecting unit 36, a short-circuit portion detecting unit 38, and a power transmission control unit 42. Though not shown, controller 30 further includes means for controlling inverter 31 and boosting converter 12.

Motor control phase voltage calculating unit 32 receives input voltage Vm of inverter 14 from voltage sensor 13, motor currents Iu, Iv and Iw flowing through respective phases of motor generator MG2 from current sensor 24, and receives torque command value TR2 from external ECU. Based on these input signals, motor control phase voltage calculating unit 32 calculates voltage amounts (hereinafter also referred to as voltage commands) Vu*, Vv* and Vw* to be applied to the coils of respective phases of motor generator MG2, and outputs the calculated results to inverter driving signal converting unit 34.

Inverter driving signal converting unit 34 generates the signal DRV2 that actually turns on/off each of the IGBT elements Q3 to Q8 of inverter 14, based on the voltage commands Vu* Vv* and Vw* of the coils of respective phases from motor control phase voltage calculating unit 32, and outputs the generated signal DRV2 to each of the IGBT elements Q3 to Q8.

Consequently, each of the IGBT elements Q3 to Q8 is switching-controlled, and controls the current caused to flow to each phase of motor generator MG2 such that motor generator MG2 outputs the designated torque. In this manner, motor driving current MCRT2 is controlled and the motor torque in accordance with the torque command value TR2 is output.

Inverter failure detecting unit 36 detects malfunction of inverter 14 while driving of motor generator MG2 is controlled. The failure detection of inverter 14 is performed, for example, based on a detection value of a current sensor included in each of the IGBT elements Q3 to Q8 of inverter 14. Here, in response to a detection of excessive current in any of the values detected by the current sensors, inverter failure detecting unit 36 determines a failure caused by short-circuit of IGBT element Q3 to Q8, and generates a signal FINV representing the determined result. Inverter failure detecting unit 36 outputs the generated signal FINV to short-circuit portion detecting unit 38 and inverter driving signal converting unit 34.

Failure detection of inverter 14 may be performed based on the value detected by a temperature sensor provided in each of IGBT elements Q3 to Q8. In that case, in response to detection of overheating of an IGBT element, as indicated by any of the values detected by the temperature sensors attaining a high temperature, a failure caused by short-circuit of IGBT elements Q3 to Q8 is determined.

Receiving the signal FINV from inverter failure detecting unit 36, short-circuit portion detecting unit 38 identifies the IGBT in which short-circuit occurred, based on the motor currents Iu, Iv and Iw from current sensor 24. Short-circuit portion detecting unit 38 identifies the phase where short-circuit occurred and the arm (upper arm or lower arm) where the short-circuit occurred in that phase, in accordance with a method that will be described later. Then, short-circuit portion detecting unit 38 generates a signal DE indicating the identified short-circuited portion, and outputs the signal to power transmission control unit 42 and inverter driving signal converting unit 34.

Receiving the signal DE from short-circuit portion detecting unit 38, power transmission control unit 42 disconnects clutch 51, to cut power transmission between motor generator MG2 and drive shaft 52. This is to prevent motor generator MG2 from receiving power transmitted from wheels 54, because if the power was transmitted, it would rotate at high speed, generate high back electromotive force and increase motor driving current. For this purpose, power transmission control unit 42 intentionally disconnects clutch 51 and thereby immediately decreases motor rotation number.

Once the motor rotation number MRN2 decreases to a prescribed value or lower, power transmission control unit 42 again couples the clutch 51, as will be described later. Thus, the vehicle enters a limp mode, in which motor generator MG2 serves as a driving source.

Here, after the detection of failure of inverter 14, inverter driving signal converting unit 34 generates the signal DRV2 for switching control of IGBT elements Q3 to Q8 of inverter 14, based on voltage commands Vu*, Vv* and Vw* of coils of respective phases from motor control phase voltage calculating unit 32 and on the signal DE from short-circuit portion detecting unit 38, and outputs the generated signal DRV2 to inverter 14. As a result, even after the failure caused by short-circuit, inverter 14 can continuously control driving of motor generator MG2 and, therefore, the vehicle can surely run in the limp mode.

As will be described later, at the time of failure of inverter 14 caused by short-circuit, the signal DRV2 is generated to cause switching operation of a phase different from the phase to which the failed arm belongs, so as to prevent an excessive current from flowing to the IGBT element of the arm failed by short-circuit. Thus, it becomes possible to move the vehicle to a safe place while preventing overheating of inverter 14.

As described above, the first characteristic of motor drive device 100 in accordance with the present invention is that in response to a detection of failure of inverter 14, the arm that failed because of short-circuit is identified from three phases 15 to 17 forming inverter 14.

The second characteristic of motor drive device 100 is that after the detection of failure of inverter 14, by switching-control of a phase other than the phase to which the short-circuited arm belongs, motor generator MG2 is continuously driven.

Because of these characteristics, the vehicle mounting the motor drive device 100 surely runs in the limp mode, while overheating of inverter 14 is prevented. In the following, the first and second characteristics will be described in greater detail.

First, the method of identifying the arm that failed because of short-circuit of inverter 14, which is the first characteristic of the present invention, will be described.

Figure 4:
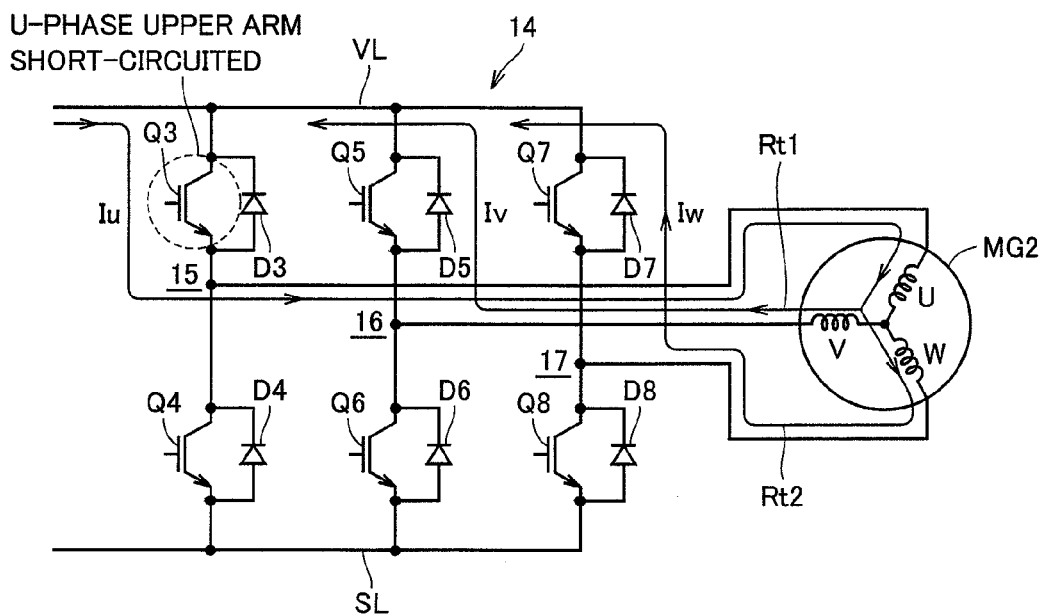
FIG. 4 is an illustration showing the manner of identifying an arm failed by short-circuit, of the inverter.

FIG. 4 is an illustration related to the method of identifying the short-circuited arm of inverter 14.

Referring to FIG. 4, assume that the upper arm of U-phase 15 (that is, IGBT element Q3) failed because of short-circuit, among three phases 15 to 17 forming inverter 14.

At this time, in response to a detection of excessive current by the current sensor provided in IGBT element Q3, inverter failure detecting unit 36 outputs the signal FINV to inverter driving signal converting unit 34, and stops operation of inverter 14. At this time, however, motor generator MG2 is still rotating, as it receives rotations of wheels 54. Therefore, back electromotive force corresponding to the rotation number generates in motor generator MG2. Thus, an excessive short-circuit current would be induced to the short-circuited U-phase 15 in inverter 14.

More specifically, when the power supply line VL of inverter 14 is conducted to the midpoint of U-phase 15 because of the short-circuit of IGBT element Q3, U-phase motor current Iu flows through a route from power supply line VL through midpoint of U-phase 15 to U-phase coil of motor generator MG. The U-phase motor current Iu is branched at the midpoint of motor generator MG2 to a first route Rt1 from V-phase coil through midpoint of V-phase 16 and diode D5 to power supply line VL, and a second route Rt2 from W-phase coil through midpoint of W-phase coil 17 and diode D17 to power supply line VL.

Specifically, in the three phases 15 to 17, the short-circuited upper arm of U-phase 15 and diodes D5 and D7 of V- and W-phases 16 and 17 form a closed circuit, with motor generator MG2 interposed. In the closed circuit, the relation represented by the following equation (1) holds among three-phase motor currents Iu, Iv and Iw:

$$|Iu|=|Iv|+|Iw| \quad (1)$$

Figure 5:
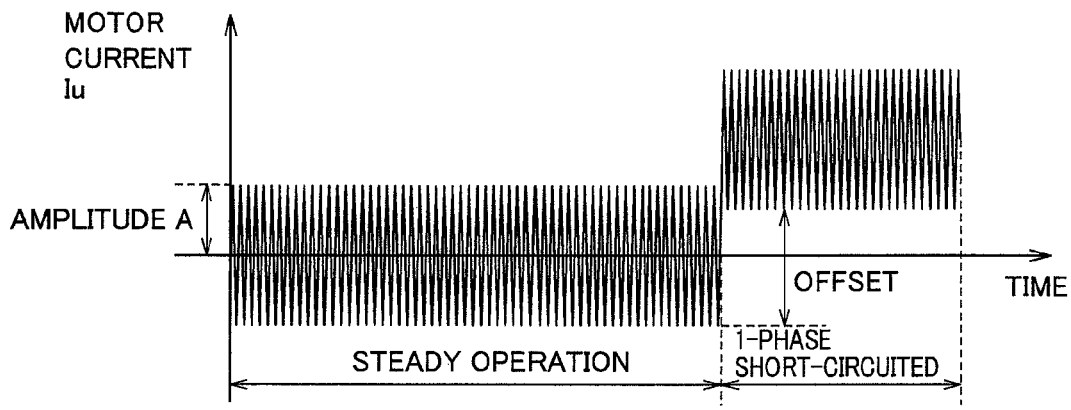
FIG. 5 shows an output waveform of a motor current flowing through short-circuited U-phase.

Accordingly, an excessive short-circuit current that corresponds to approximately double the current value in a steady operation possibly flows to the short-circuited U-phase 15, as shown in FIG. 5.

FIG. 5 shows an output waveform of motor current Iu that flows through the short-circuited U-phase 15.

As is apparent from FIG. 5, in the steady operation, motor current Iu shows AC waveform of constant amplitude (amplitude A). It is noted that motor currents Iv and Iw, not shown, also show AC waveform of amplitude A, and each has a phase difference of +120° or −120° with respect to motor current Iu.

On the contrary, after the occurrence of short-circuit failure, the motor current Iu comes to be the sum of motor currents Iv and Iw and, as shown in the figure, comes to have a current waveform offset to the higher current side. The absolute value of offset at this time exceeds the amplitude A in the steady operation.

In view of the foregoing, the present embodiment is configured such that for each of the motor currents Iu, Iv and Iw detected by current sensor 24, the offset value is detected, and determination is made as to whether the absolute value of detected offset value exceeds the amplitude A in the steady operation or not. In this configuration, in response to a determination that the absolute value of offset of any of motor currents Iu, Iv and Iw exceeds the amplitude A, short-circuit failure of the phase corresponding to the motor current can be detected.

After the phase in which short-circuit failure occurred is detected based on the magnitude relation between the offset value and the amplitude A, the short-circuited arm is identified based on the polarity of offset value.

More specifically, let us represent the direction of motor current flowing from each of the phases 15 to 17 of inverter 14 to motor generator MG2 as positive direction, and the direction of current flowing from motor generator MG2 to each of the phases 15 to 17 as negative direction. If the current value of motor currents Iu, Iv and Iw increases in the positive direction, that is, if the offset value has positive polarity, it is determined that the upper arm failed because of short-circuit. On the other hand, if the current value of motor currents Iu, Iv and Iw increases in the negative direction, that is, if the offset value has negative polarity, it is determined that the lower arm failed because of short-circuit.

As described above, by detecting motor currents Iu, Iv and Iw flowing through coils of respective phases by current sensor 24 and by detecting the absolute value and polarity of the offset value with respect to the current waveform in the steady operation from the detected value, it is possible to identify the arm in which short-circuit failure occurred.

The short-circuit failure in inverter 14 includes a pattern of FIG. 4 in which only one phase failed because of short-circuit among three phases and, in addition, patterns in which two phases or three phases fail because of short-circuit. If two phases or three phases fail, however, the absolute value of offset of the motor current detected by current sensor 24 is relatively small as compared with that in one-phase short-circuit failure shown in FIG. 5, and smaller than amplitude A in the steady operation. Therefore, it can be distinguished from the short-circuit failure of one phase.

Next, the drive control of motor generator MG2 after the detection of inverter failure, as the second characteristic of the present invention, will be described.

Figure 7:
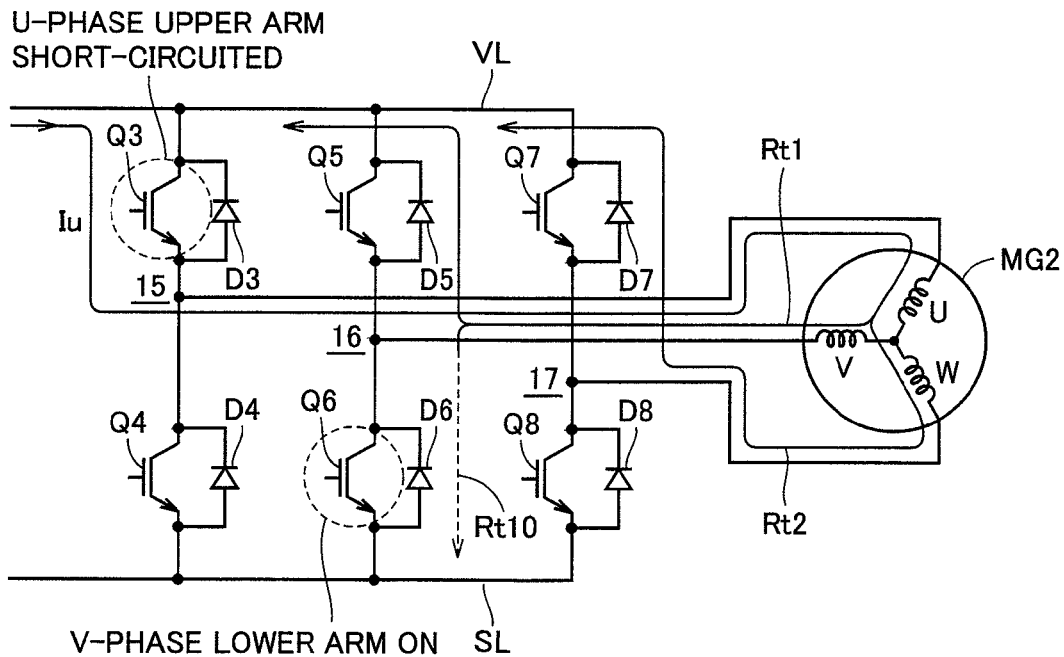
FIG. 7 is an illustration related to motor generator drive control.
Figure 8:
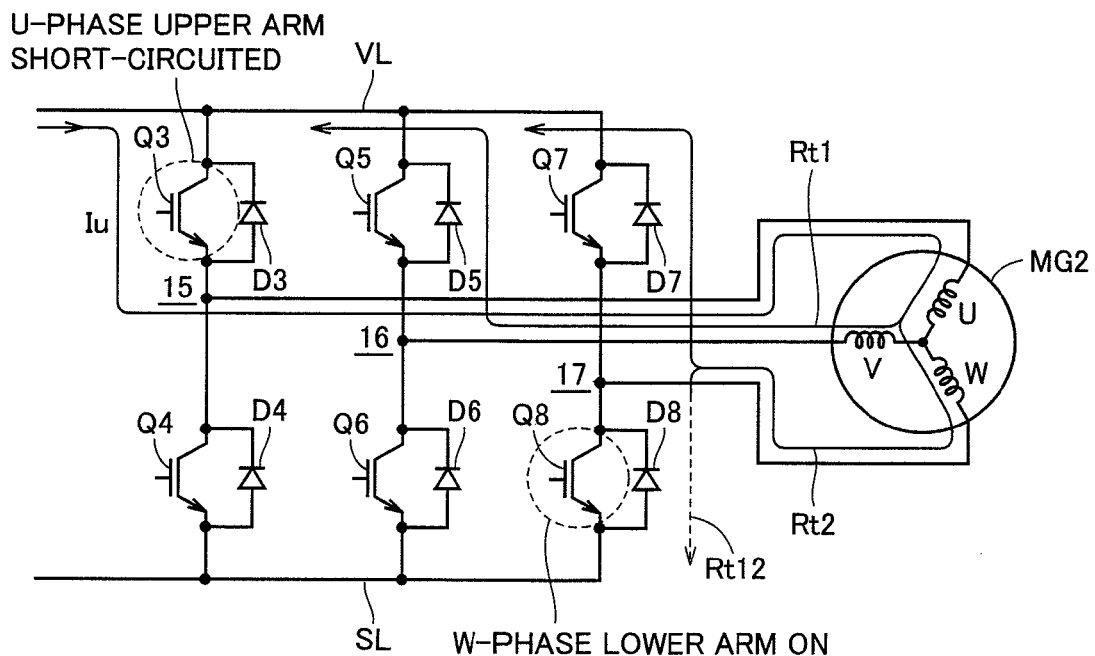
FIG. 8 is an illustration related to motor generator drive control.

FIGS. 7 and 8 illustrate drive control of motor generator MG2. Similar to FIG. 4, FIGS. 7 and 8 show that the upper arm of U-phase 15 (IGBT element Q3) failed because of short-circuit.

Referring to FIGS. 7 and 8, when the upper arm of U-phase 15 failed because of short-circuit, motor generator MG is driven by causing switching operations of the lower arm of V-phase 16 (IGBT element Q6) and the lower arm of W-phase 17 (IGBT element Q8).

The lower arm of V-phase 16 and the lower arm of W-phase 17, which are switching controlled, belong to normal phases different from the short-circuited U-phase 15 and, as regards positional relation, these arms are opposite to the upper arm of U-phase 15, with midpoints of respective phases 15 to 17 positioned therebetween. In the present invention, an arm that belongs to a phase different from the short-circuited phase and, as regards the positional relation, is opposite to the short-circuited arm with the midpoint of each of the phases 15 to 17 positioned therebetween, will be also simply referred to as an "opposite arm."

Specifically, as shown in FIG. 7, when only the lower arm of V-phase 16 (IGBT element Q6) is turned on, the route of motor current Iu is switched from route Rt1, which extends from V-phase coil of motor generator MG through diode D5 to power supply line VL, to a route Rt10, which extends from V-phase coil through IGBT element Q6 to the ground line GL. Therefore, in the closed circuit formed by the upper arm of U-phase 15 and diodes D5 and D7 of V- and W-phases 16 and 17, only the motor current Iw that passes through diode D7 is fed back. As a result, motor current Iu is reduced.

Similarly, referring to FIG. 8, when only the lower arm of W-phase 17 (IGBT element Q8) is turned on, the route of motor current Iu is switched from route Rt2, which extends from W-phase coil of motor generator MG2 through diode D7 to power supply line VL, to a route Rt12, which extends from W-phase coil through IGBT element Q8 to the ground line GL. Therefore, in the closed circuit formed by the upper arm of U-phase 15 and diodes D5 and D7 of V- and W-phases 16 and 17, only the motor current Iv that passes through diode D5 is fed back. As a result, motor current Iu is reduced.

Figure 9:
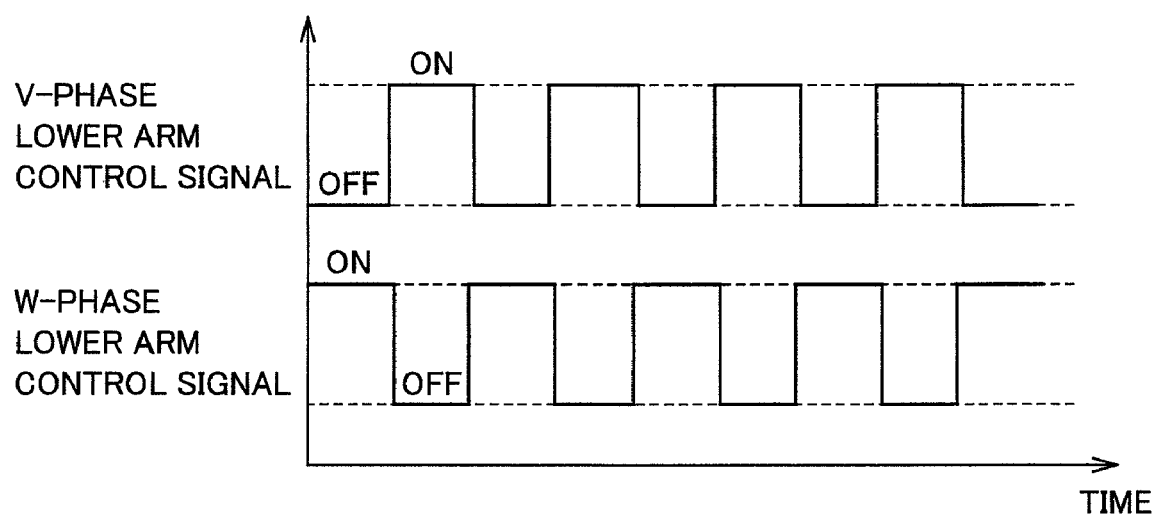
FIG. 9 is a timing chart of control signals for switching arms opposite to the U-phase upper arm.

FIG. 9 is a timing chart of a control signal for causing switching operation of the lower arm of V-phase 16 and the lower arm of W-phase 17, as arms opposite to the upper arm of U-phase 15.

As shown in FIG. 9, the lower arm of V-phase 16 and the lower arm of W-phase 17 are turned on/off at a prescribed duty ratio. By turning on/off the lower arm of V-phase 16 and the lower arm of W-phase 17 in this manner, a voltage waveform is induced at the midpoint of each of the phases 16 and 17, which waveform switches between the power supply voltage and the ground voltage, in a rectangular waveform of a prescribed duty ratio. As a result, a continuous AC current comes to flow through motor generator MG2.

In the switching operation shown in FIG. 9, the lower arm of V-phase 16 and the lower arm of W-phase 17 are both connected in series between the ground line and the midpoint of motor generator MG2 which is conducted to the power supply line. Therefore, it is necessary to prevent these from simultaneously turning on. Therefore, the control signal has a prescribed dead time, to prevent simultaneous turn-on of these two arms.

As described above, as the motor generator MG2 is driven by switching arms opposite to the short-circuited arm, it becomes possible to continuously drive motor generator MG2, while increase of current passing through the short-circuited phase is prevented. As a result, the vehicle mounting the motor drive device can surely run to a safe place in the limp mode, with only the existing device structure, without any necessity of new device for continuously driving motor generator MG2.

After the vehicle enters the limp mode running, it is necessary to limit the power consumption of motor generator MG2, to ensure sufficient travel distance. Specifically, controller 30 controls inverter 14 such that motor generator MG2 is driven with low torque and low rotation number. Here, inverter driving signal converting unit 34 of controller 30 sets a carrier frequency fc based on the torque and motor rotation number of motor generator MG2 necessary to ensure running of the vehicle to the safe place.

Figure 10:
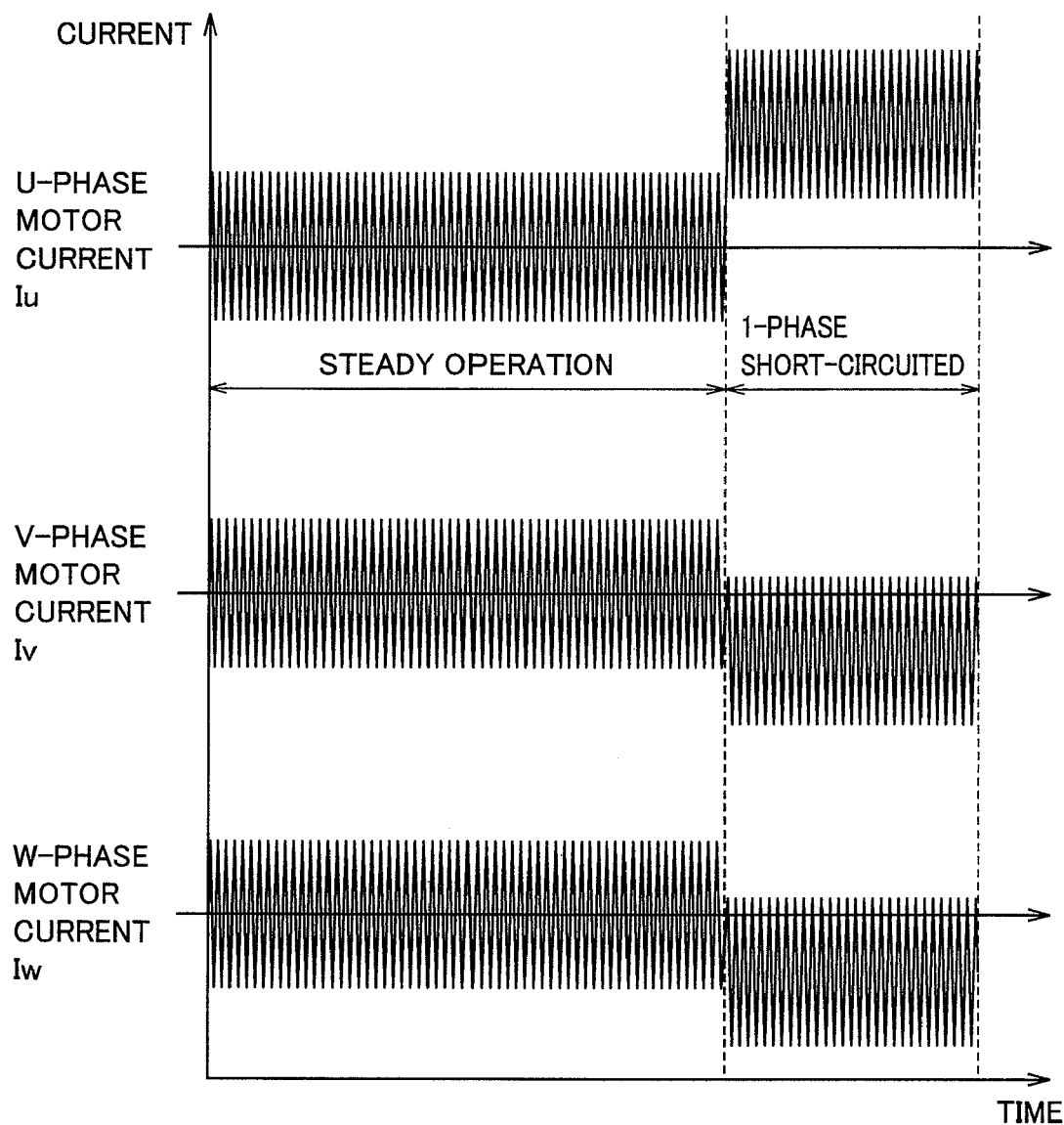
FIG. 10 shows output waveforms of motor currents flowing through V- and W-phases, when the U-phase upper arm is short-circuited.

FIG. 10 shows output waveforms of motor currents Iv and Iw flowing through V-phase 16 and W-phase 17, respectively, when the upper arm of U-phase 15 failed because of short-circuit.

Figure 6:
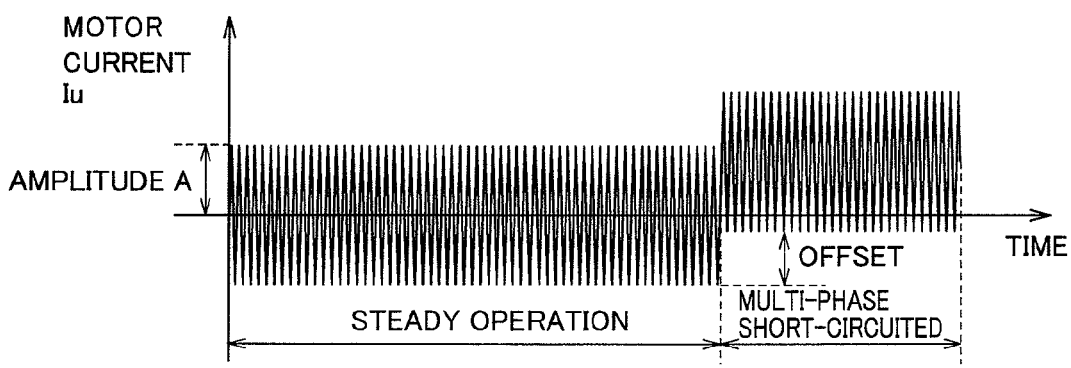
FIG. 6 shows an output waveform of a motor current flowing through a plurality of short-circuited phases.
Figure 11:
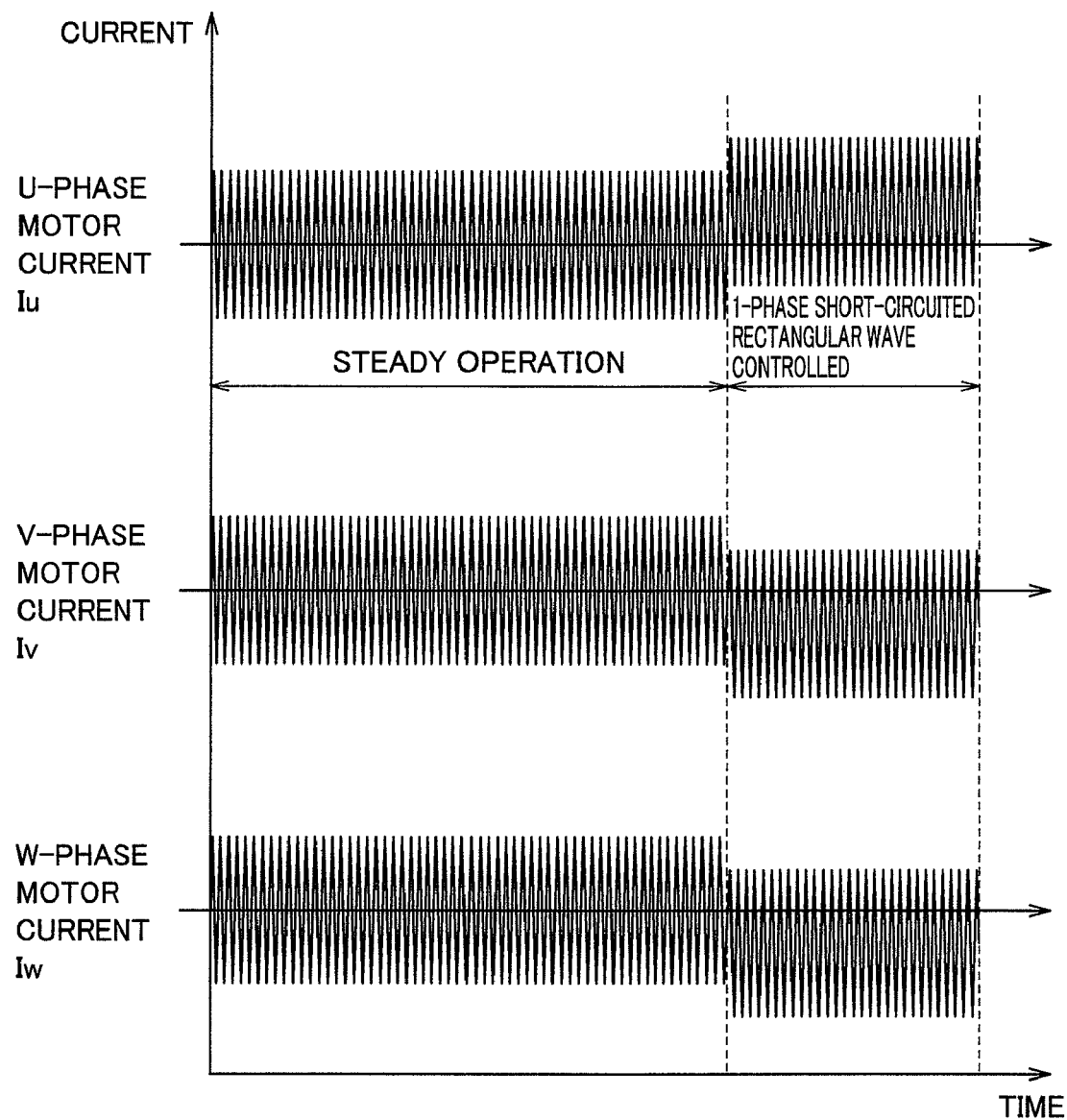
FIG. 11 shows output waveforms of motor currents flowing through respective phases, in accordance with the motor drive control of the present invention.

FIG. 11 shows output waveforms of motor currents Iu, Iv and Iw flowing through respective phases 15 to 17 in accordance with the motor drive control of the present invention. FIG. 11 results from switching control of the lower arm of V-phase 16 and the lower arm of W-phase 17 as the opposite arms, when the upper arm of U-phase 15 failed because of short-circuit, as described with reference to FIGS. 6 and 7.

When we compare FIGS. 10 and 11, it can be seen that the offset caused by short-circuit failure of upper arm in motor current Iu passing through U-phase 15 comes to have decreased absolute value, when opposite arms are switch-controlled. Consequently, it becomes possible to drive motor generator MG2 while increase in current passing through the short-circuited phase is prevented.

Figure 12:
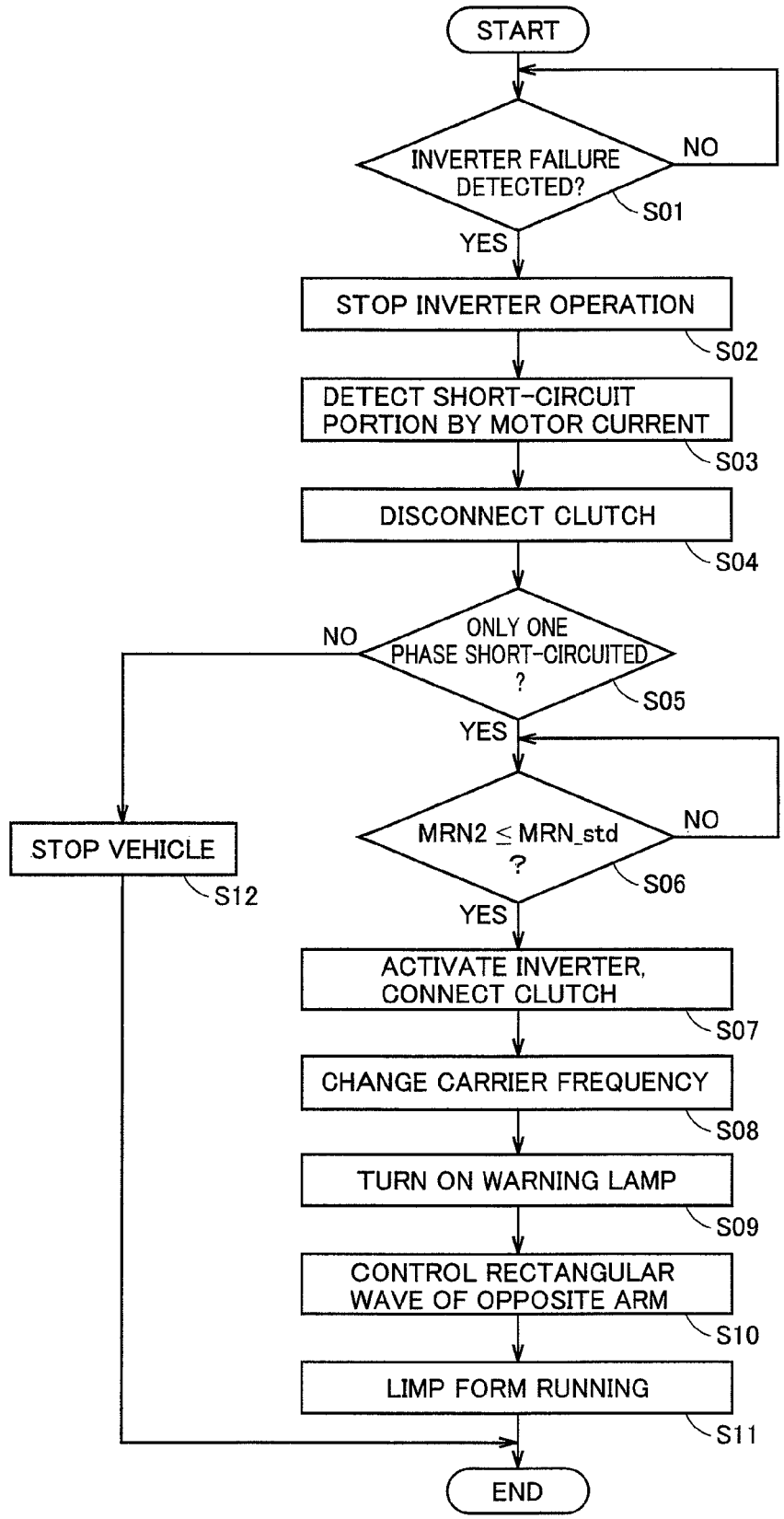
FIG. 12 is a flowchart illustrating the motor drive control in accordance with Embodiment 1 of the present invention.

FIG. 12 is a flowchart representing the motor drive control in accordance with Embodiment 1 of the present invention.

Referring to FIG. 12, inverter failure detecting unit 36 detects a malfunction of inverter 14, based on a value detected by the current sensor provided in each of IGBT elements Q3 to Q8, while driving of motor generator MG2 is controlled (step S01). At this time, in response to detection of an excessive current in any of the values detected by the current sensors, inverter failure detecting unit 36 determines a failure caused by short-circuit of any of IGBT elements Q3 to Q8, and generates a signal FINV representing the determination result. The generated signal FINV is output to short-circuit portion detecting unit 38 and inverter driving signal converting unit 34.

Receiving the signal FINV, inverter driving signal converting unit 34 once stops generation of the signal DRV for switching control of each of IGBT elements Q3 to Q8 of inverter 14 to protect the IGBT elements from excessive current, whereby inverter 14 is set to a suspended state (step S02).

Next, receiving the signal FINV, short-circuit portion detecting unit 38 identifies the IGBT element at which short-circuit failure occurred, based on motor currents Iu, Iv and Iw from current sensor 24, in accordance with the method described above (step S03). After identifying the phase where the short-circuit failure occurred and the arm (either the upper arm or the lower arm) that is short-circuited in that phase, short-circuit portion detecting unit 38 generates a signal DE indicating the identified portion of failure, and outputs the signal to inverter driving signal converting unit 34 and power transmission control unit 42.

Receiving the signal DE from short-circuit portion detecting unit 38, power transmission control unit 42 disconnects clutch 51, and cuts off the power transmission between motor generator MG2 and drive shaft 52 (step S04). Consequently, motor rotation number decreases rapidly, and hence, generation of large back electromotive force in motor generator MG2 can be prevented. It is noted that if the motor rotation number is equal to or lower than a prescribed rotation number, the clutch 51 may not be disconnected.

Further, based on the signal DE from short-circuit portion detecting unit 38, power transmission control unit 42 and inverter driving signal converting unit 34 determine whether only one phase failed because of short-circuit (step S05). If it is determined that only one phase failed because of short-circuit, power transmission control unit 42 waits for motor rotation number MRN2 to attain to a prescribed value MRN_std or lower (step S06), and then, again couples clutch 51 (step S07). Thus, the vehicle enters the limp mode, in which motor generator MG2 serves as the power source.

Further, if it is determined from the signal DE from short-circuit portion detecting unit 38 that short-circuit failure occurred in only one phase, inverter driving signal converting unit 34 changes the carrier frequency of a carrier signal from the carrier frequency for normal operation to a carrier frequency for the case of inverter failure. (step S08).

Further, in a compartment, an alarm lamp is turned on to notify the user that the vehicle entered the limp mode running (step S09).

Based on the voltage commands Vu*, Vv* and Vw* of respective phases received from motor control phase voltage calculating unit 32 and on the carrier signal having the changed carrier frequency fc, inverter driving signal converting unit 34 generates a signal DRV2 for switching control of the arms opposite to the short-circuited arm, and outputs the generated signal DRV2 to inverter 14 (step S10).

As a result, even after the occurrence of short-circuit failure, inverter continuously controls driving of motor generator MG2, and the vehicle can surely run in the limp mode (step S11).

If it is determined at step S05 that a plurality of phases failed because of short-circuit, coupling of clutch 51 by power transmission control unit 42 does not take place, and the common vehicle stopping control starts (step S12).

As described above, according to Embodiment 1 of the present invention, in response to detection of an inverter failure, the short-circuited arm is identified, and arms opposite to the identified failed arm are switching-operated, whereby driving of the motor generator is continued. Therefore, it becomes possible to ensure running of the vehicle in the limp mode, while flow of excessive current to the failed arm is prevented. As a result, motor safety and output performance when the inverter failure is detected can both be realized, with a simple and inexpensive device structure.

Embodiment 2

As to the method of identifying the short-circuited arm of inverter 14 as the first characteristic of the present invention, other than the method of identification based on the motor currents Iu, Iv and Iw of inverter 14, identification based on inter-phase voltage of motor generator, which will be described later, is also possible.

Figure 13:
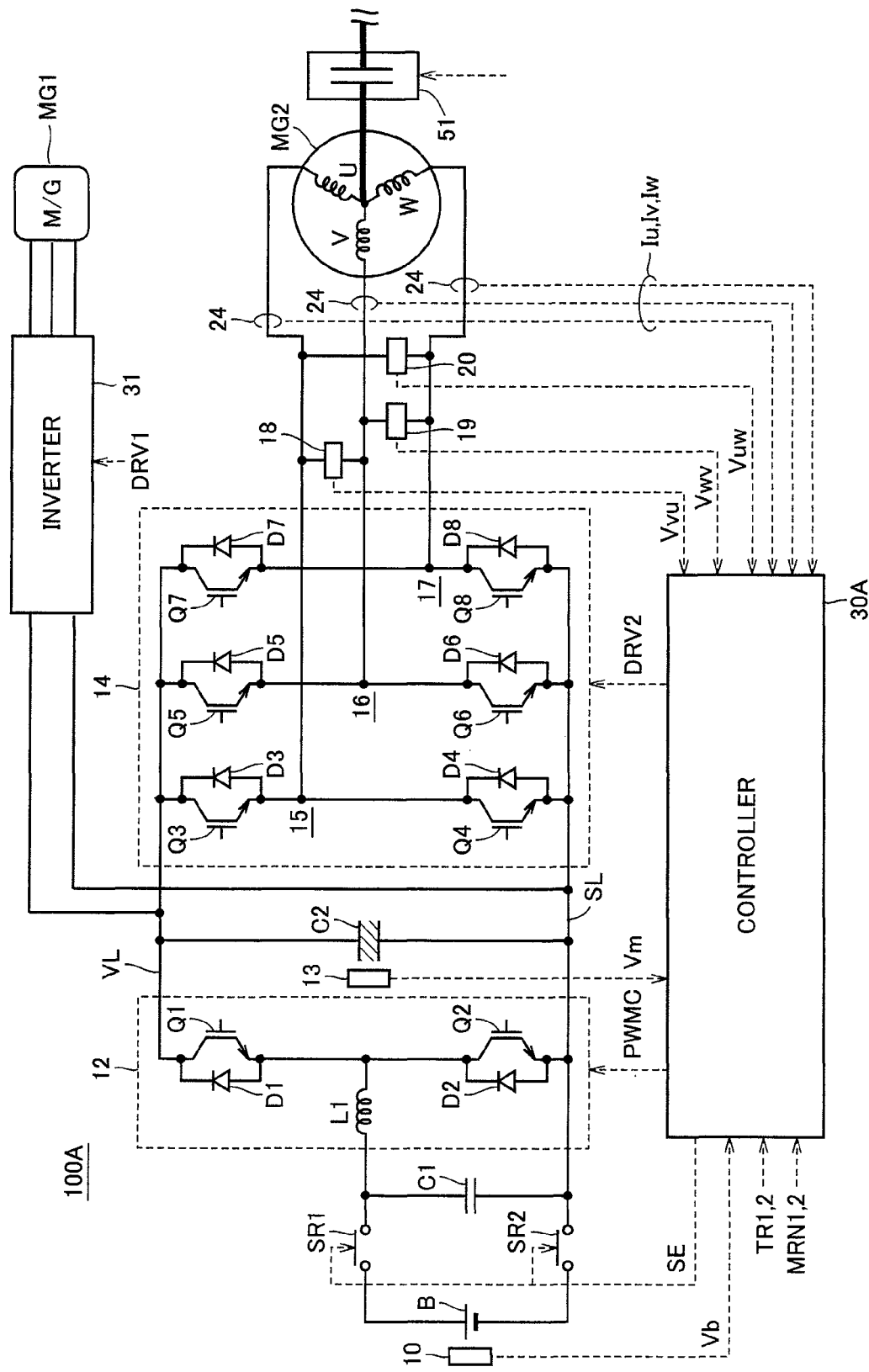
FIG. 13 is a block diagram of a motor drive device in accordance with Embodiment 2 of the present invention.

FIG. 13 is a schematic block diagram of motor drive device in accordance with Embodiment 2 of the present invention. Motor drive device 100A corresponds to motor drive device 100 of FIG. 1, additionally including voltage sensors 18 to 20 for detecting the inter-phase voltage of motor generator 2 and having a controller 30A in place of controller 30. Therefore, detailed descriptions of portions common to those of FIG. 1 will not be repeated.

Referring to FIG. 13, voltage sensor 18 detects an inter-phase voltage Vvu between the U-phase and V-phase of motor generator MG2, and outputs the detected inter-phase voltage Vvu to controller 30A. Voltage sensor 19 detects an inter-phase voltage Vwv between the V-phase and W-phase of motor generator MG2, and outputs the detected inter-phase voltage Vwv to controller 30A. Voltage sensor 20 detects an inter-phase voltage Vuw between the U-phase and the W-phase of motor generator MG2, and outputs the detected inter-phase voltage Vuw to controller 30A.

Figure 14:
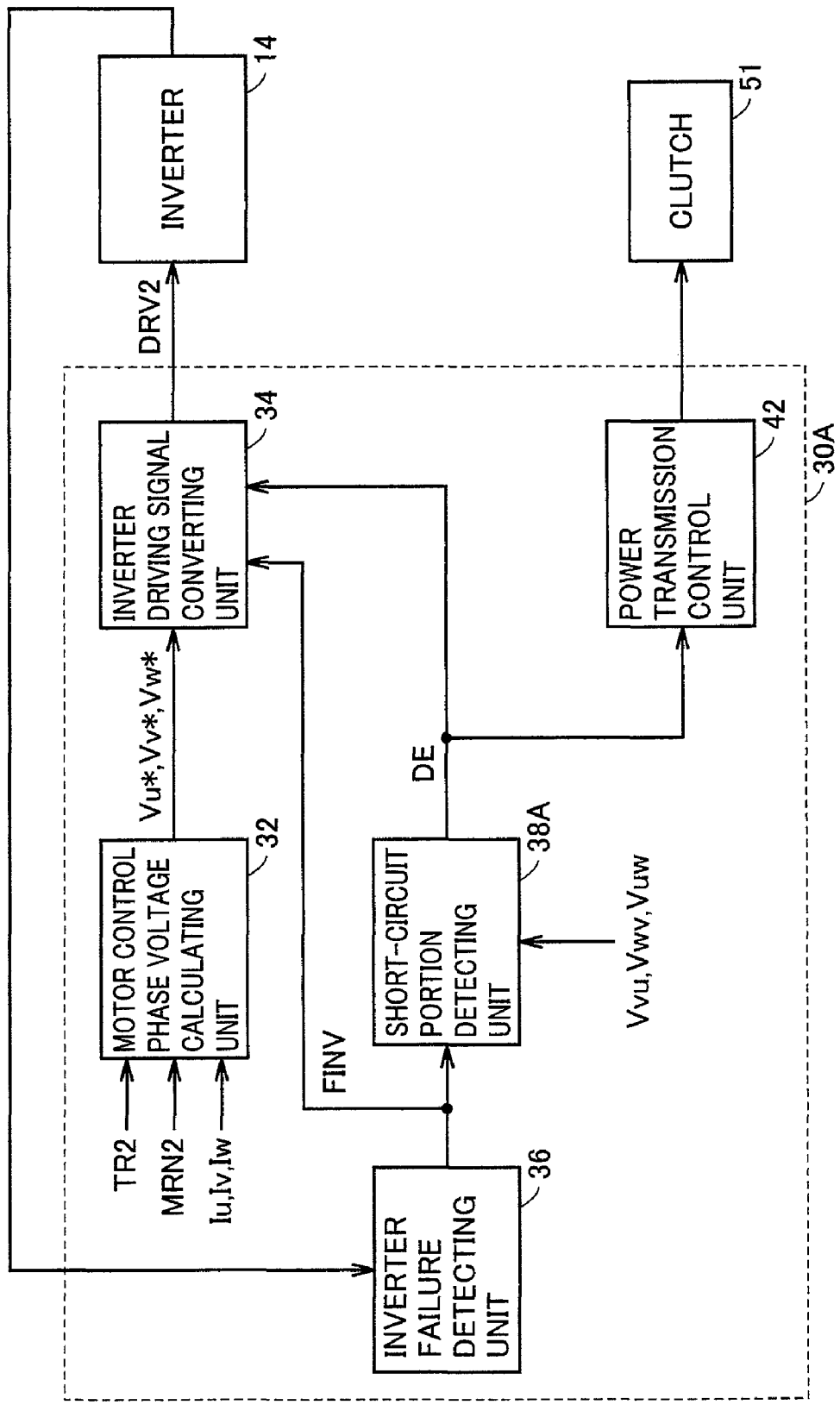
FIG. 14 is a functional block diagram of the controller shown in FIG. 13.

FIG. 14 is a functional block diagram of controller 30A shown in FIG. 13. Controller 30A of FIG. 13 corresponds to controller 30 shown in FIG. 2, with short-circuit portion detecting unit 38 replaced by a short-circuit portion detecting unit 38A. Therefore, detailed descriptions of portions common to those of FIG. 2 will not be repeated.

Referring to FIG. 14, receiving the signal INV from inverter failure detecting unit 36, short-circuit portion detecting unit 38A identifies, by the method described in the following, the phase where the short-circuit failure occurred and the short-circuited arm in that phase (either the upper arm or lower arm), based on the inter-phase voltages Vvu, Vwv and Vuw of motor generator MG2, input from voltage sensors 18 to 20 described above. Then, short-circuit portion detecting unit 38A generates a signal DE indicating the identified short-circuit portion, and outputs it to inverter driving signal converting unit 34 and power transmission control unit 42.

First, the inter-phase voltage used in the method of identifying the short-circuit portion in accordance with the embodiment of the present invention will be defined.

Figure 15:
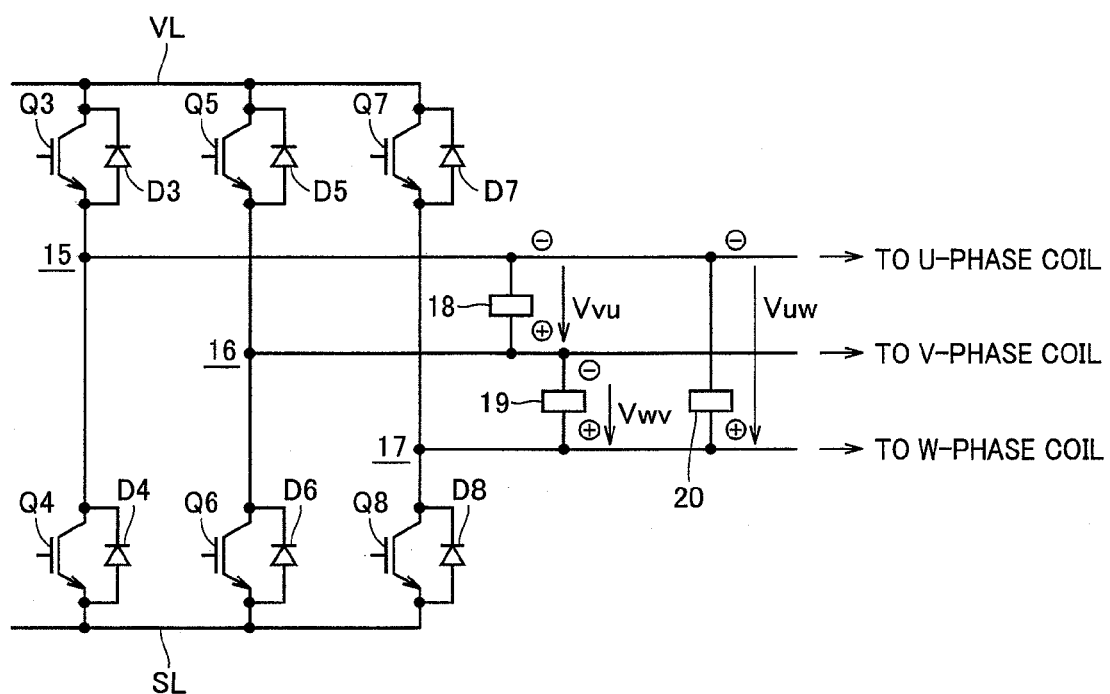
FIG. 15 is an illustration for defining inter-phase voltages of the motor generator.

FIG. 15 is a diagram related to the definition of inter-phase voltages of motor generator MG2.

Referring to FIG. 15, the inter-phase voltage Vvu between the U-phase and V-phase of motor generator MG2 is considered positive when the V-phase has higher potential than the U-phase, and considered negative when the U-phase has higher potential than the V-phase. The inter-phase voltage Vwv between the V-phase and the W-phase of motor generator MG2 is considered positive when the W-phase has higher potential than the V-phase, and considered negative then the V-phase has higher potential than the W-phase. The inter-phase voltage Vuw between the W-phase and the U-phase of motor generator MG2 is considered positive when the W-phase has higher potential than the U-phase, and considered negative when the U-phase has higher potential than the W-phase.

Therefore, voltage sensors 18 to 20 output positive or negative inter-phase voltages Vvu, Vwv and Vuw, in accordance with the potentials of corresponding two phases.

Figure 16:
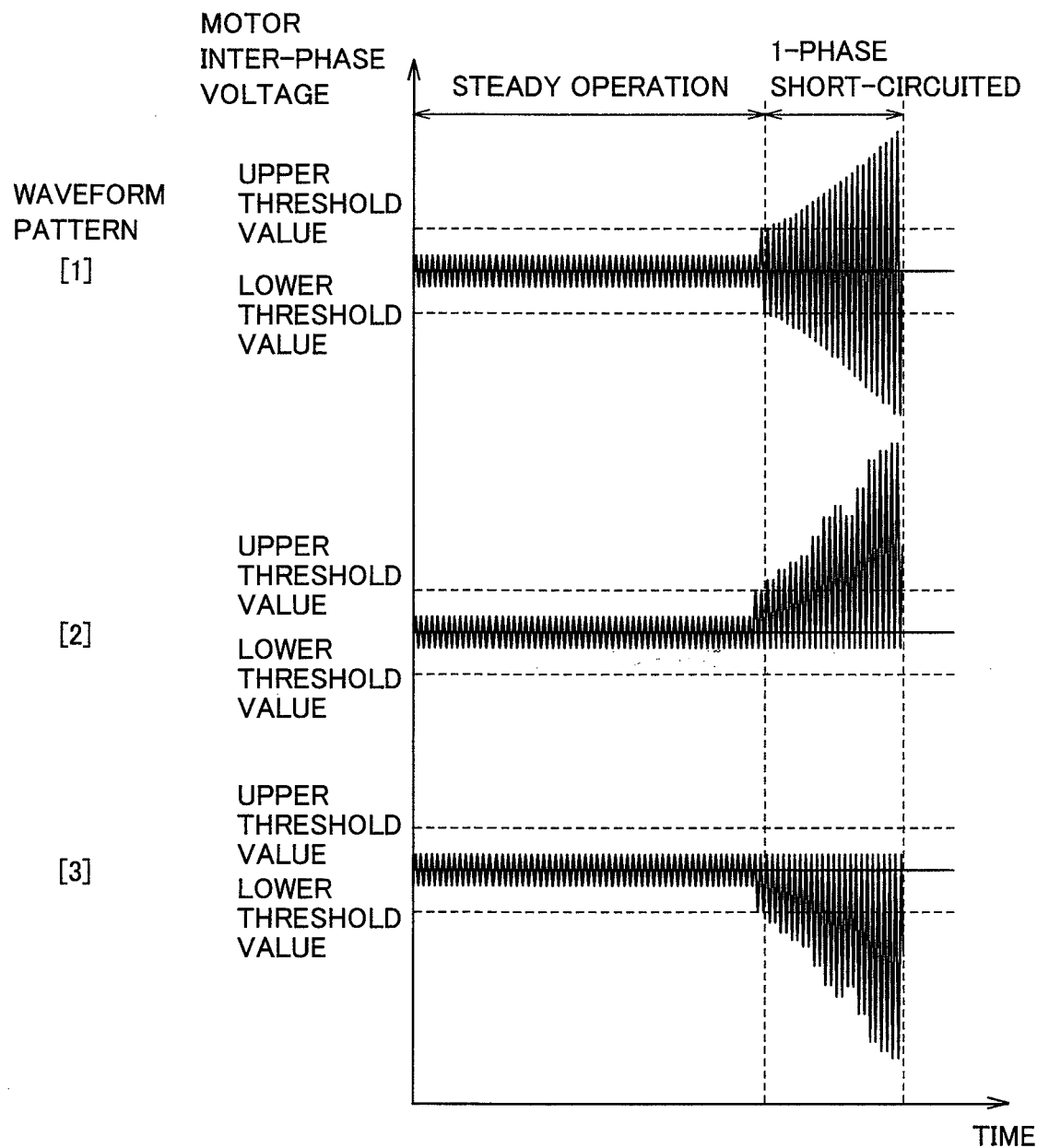
FIG. 16 shows output waveforms of inter-phase voltages when W-phase upper arm is short-circuited.

FIG. 16 shows output waveforms of respective inter-phase voltages Vvu, Vwv and Vuw, when, as an example, the upper arm of W-phase 17 failed because of short-circuit.

Referring to FIG. 16, in the steady operation, respective inter-phase voltages Vvu, Vwv and Vuw show AC waveforms of constant amplitude.

After the time point when the upper arm of W-phase 17 is short-circuited, the inter-phase voltage Vvu between the U-phase and the V-phase, not including the short-circuited phase, comes to have the waveform pattern shown by [1] in the figure. Specifically, the waveform amplitude increases in positive and negative directions, exceeding preset upper and lower threshold values.

The inter-phase voltage Vwv between the V-phase and the W-phase corresponding to the short-circuited phase comes to have the waveform pattern shown by [2] in the figure. Specifically, the waveform amplitude increases only in the positive direction. This is because the potential of W-phase 17 increases, as the current passing through the short-circuited W-phase 17 increases.

The inter-phase voltage Vuw between the W-phase corresponding to the short-circuited phase 17 and the U-phase comes to have the waveform pattern shown by [3] in the figure. Specifically, the waveform amplitude increases only in the negative direction. This is because the potential of W-phase 17 increases, as the current passing through the short-circuited W-phase increases, as in the case of waveform pattern [2] above.

As described above, when one of the U-, V- and W-phases fails because of short-circuit, among the inter-phase voltages Vvu, Vwv and Vuw of motor generator MG2, the inter-phase voltage between two phases not including the failed phase comes to have its amplitude increased both in the positive and negative directions. In contrast, the inter-phase voltage between two phases with one including the failed phase 17 comes to have its amplitude increased either in the positive direction or the negative direction, dependent on the short-circuited phase. FIG. 17 shows relations between the waveform patterns of inter-phase voltages Vvu, Vwv and Vuw of the motor generator MG2, the short-circuited phase and short-circuited arm. As can be seen from FIG. 17, combination of voltage waveform patterns [1] to [3] differs arm by arm and phase by phase that failed because of short-circuit.

Therefore, the present embodiment is adapted to determine whether the amplitude of inter-phase voltages Vvu, Vwv and Vuw detected by voltage sensors 18 to 20 exceeds the upper and lower threshold values. By this configuration, when the amplitude of any one of the inter-phase voltages Vvu, Vwv and Vuw exceeds the upper and lower threshold values and the amplitude of remaining two inter-phase voltages exceed the upper or lower threshold value, it is possible to identify the short-circuited phase and the short-circuited arm of that phase.

Actually, the short-circuit portion detecting unit 38 of controller 30A stores in advance the relations among the waveform patterns of inter-phase voltages Vvu, Vwv and Vuw of motor generator MG2 and the short-circuited phase and short-circuited arm as shown in FIG. 17 in a storage area, and by comparing the amplitude of inter-phase voltages Vvu, Vwv and Vuw from voltage sensors 18 to 20 with the upper and lower threshold values and looking up the relation shown in FIG. 17, the short-circuited phase and the short-circuited arm can be identified.

Further, according to the embodiment of the present invention, not only when one phase fails as described above but when two or three phases fail because of short circuit, the short-circuited phases and the short-circuited arms can be identified based on the amplitude of inter-phase voltages Vvu, Vwv and Vuw of motor generator MG2.

Figure 18:
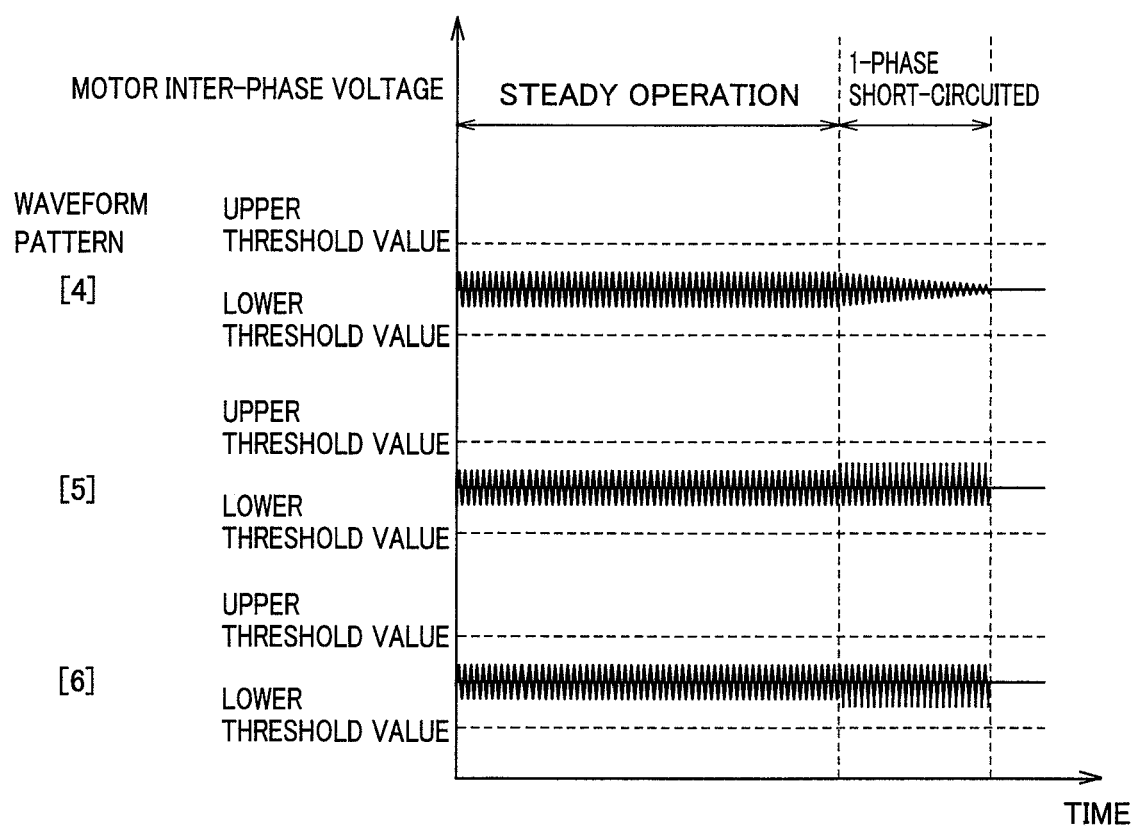
FIG. 18 shows output waveforms of inter-phase voltages of the motor generator when a plurality of phases are short-circuited.

Specifically, when a plurality of phases are short-circuited, the inter-phase voltages Vvu, Vwv and Vuw of motor generator MG2 come to show any of a total of six patterns, that is, the voltage waveform patterns [1] to [3] shown in FIG. 16 and the voltage waveform patterns [4] to [6] shown in FIG. 18.

FIG. 18 shows output waveforms of the inter-phase voltages Vvu, Vwv and Vuw when a plurality of phases are short-circuited.

Referring to FIG. 18, in the steady operation state, voltage waveform pattern [4] shows AC waveform of a constant amplitude, and the waveform amplitude decreases gradually after the point when a plurality of phases are short-circuited.

In the steady operation state, voltage waveform pattern [5] shows AC waveform of a constant amplitude, and the waveform amplitude increases only in the positive direction after the point when a plurality of phases are short-circuited. The increased amplitude is lower than the upper threshold.

In the steady operation state, voltage waveform pattern [6] shows AC waveform of a constant amplitude, and the waveform amplitude increases only in the negative direction after the point when a plurality of phases are short-circuited. The increased amplitude is smaller than the lower threshold.

When two of the three phases are short-circuited, the inter-phase voltages Vvu, Vwv and Vuw of motor generator MG2 each come to show any one of the voltage waveform patterns [1] to [6] of FIGS. 16 and 18. The combination of voltage waveform patterns differ dependent on the short-circuited phase, as shown in FIG. 19.

By way of example, referring to FIG. 19, when the upper arm of W-phase 17 and the upper arm of V-phase 16 are short-circuited, the inter-phase voltage Vvu between the V-phase as the short-circuited phase and the U-phase that is not short-circuited shows the voltage waveform pattern [2], and the amplitude exceeds the upper threshold value. Further, the inter-phase voltage Vwu between the W-phase as the short-circuited phase and the U-phase that is not short-circuited shows the voltage waveform pattern [3], and the amplitude exceeds the lower threshold value. In contrast, the inter-phase voltage Vwv between the V-phase and W-phase as short-circuited phases shows the voltage waveform pattern [4], and the amplitude gradually decreases.

When all of the three phases fail because of short-circuit, the inter-phase voltages Vvu, Vwv and Vuw come to show a combination of voltage waveform patterns shown in FIG. 20, determined dependent on the short-circuited arm in each phase.

Referring to FIG. 20, assume that upper arms of U-, V- and W-phases are all short-circuited. The U-, V- and W-phases of motor generator MG2 come to have substantially the same potential and, therefore, the inter-phase voltages Vvu, Vwv and Vuw all come to show the voltage waveform pattern [4], and the amplitude gradually decreases.

From the foregoing, by determining which of the combinations shown in FIGS. 18 and 20 corresponds to the waveform patterns of inter-phase voltages Vvu, Vwv and Vuw of motor generator MG2, it is possible to identify a plurality of short-circuited phases and the short-circuited arm in each phase.

Actually, short-circuit portion detecting unit 38A compares the amplitude of inter-phase voltages Vvu, Vwv and Vuw input from voltage sensors 18 to 20 with the upper and lower threshold values, and selects the combination of voltage waveform patterns corresponding to the result of comparison from FIGS. 18 and 20, so that the short-circuited phase and the arm can be identified.

Modification

Figure 21:
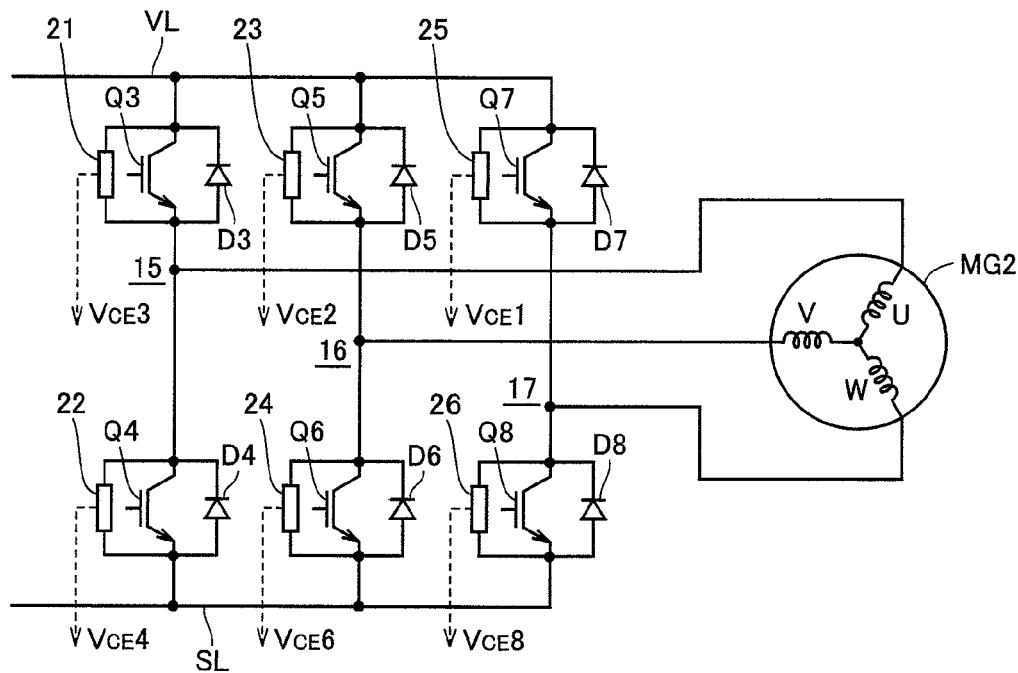
FIG. 21 is an illustration showing the manner of identifying a short-circuited portion, in accordance with a modification of Embodiment 2 of the present invention.

FIG. 21 illustrates the method of identifying the short-circuit portion, in accordance with a modification of the present embodiment.

Referring to FIG. 21, for IGBT elements Q3 to Q8 forming the U-phase 15, V-phase 16 and W-phase 17, voltage sensors 21 to 26 for detecting collector-emitter voltages VCE3 to VCE8 are provided, respectively. Voltage sensors 21 to 26 detect collector-emitter voltages VCE3 to VCE8 of the corresponding IGBT elements Q3 to Q8, respectively, and output the voltages to short-circuit portion identifying unit 38A in controller 30, not shown.

Receiving the collector-emitter voltages VCE3 to VCE8 from voltage sensors 21 to 26, respectively, short-circuit portion identifying unit 38A determines whether each of the collector-emitter voltages VCE3 to VCE8 is equal to or higher than a prescribed threshold value. Here, short-circuit portion identifying unit 38A determines, in response to a determination that any of the collector-emitter voltages VCE3 to VCE8 (for example, VCE3) remains lower than the threshold voltage continuously for a prescribed time period, that the IGBT element (that is, IGBT element Q3) corresponding to the collector-emitter voltage is short-circuited. Therefore, it is possible to identify, even when a plurality of phases are short-circuited, the short-circuited phases and the short-circuited arms, also by the method of identifying a short-circuit portion in accordance with the modification.

The method of identifying the short-circuit portion described in Embodiment 2 of the present invention is actually executed as a replacement of "detection of short-circuit portion by motor current" at step S03 in the series of motor drive control shown in FIG. 12. Therefore, when a short-circuit of only one phase is determined by the method of identification in accordance with Embodiment 2 of the present invention, the motor drive control of step S06 and the following takes place, so that the vehicle can surely run in the limp mode.

As described above, according to Embodiment 2 of the present invention, when an inverter failure is detected, the short-circuited arm can be identified more closely.

Embodiment 3

By the method of identifying the short-circuit portion in accordance with Embodiment 2 described above, it is possible to identify the short-circuited arm included not only in the single phase but also in each of the plurality of phases. Therefore, even when two of the three phases are short-circuited, it is possible to continuously drive motor generator MG2 while protecting inverter 14 from overheating, by causing switching operation of the remaining one normal phase, in the manner as will be described in the following.

In the following, drive control of motor generator MG2 after the detection of short-circuit of two phases will be described.

Figure 22:
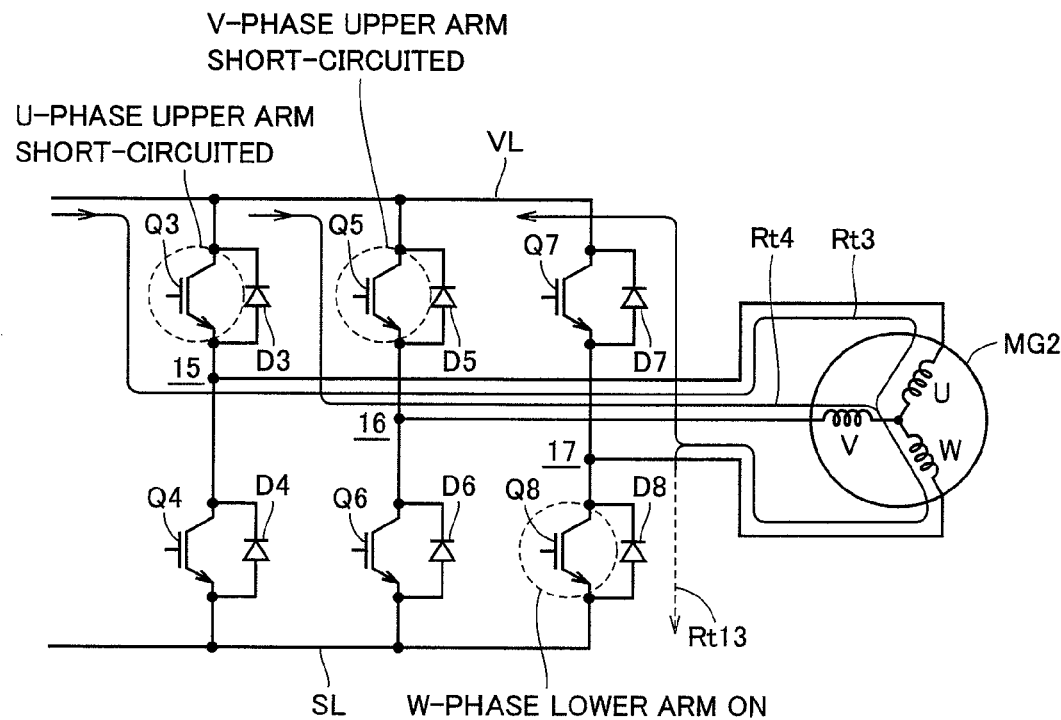
FIG. 22 is an illustration showing drive control of the motor generator.

FIG. 22 illustrates the drive control of motor generator MG2.

FIG. 22 assumes that the upper arm of U-phase 15 (IGBT element Q3) and the upper arm of V-phase 16 (IGBT element Q5) are short-circuited.

Referring to FIG. 22, when the upper arms of U-phase 15 and V-phase 16 are both short-circuited, the lower arm of W-phase 17 (IGBT element Q8), that is the opposite arm to the short-circuited arms, is switching-operated, so as to drive motor generator MG2.

More specifically, when only the lower arm of W-phase 17 (IGBT element Q8) is turned on as shown in FIG. 22, the route of motor current Iu is switched from a route Rt3 extending from the W-phase coil of motor generator MG2 through diode D7 to power supply line VL to a route Rt13 extending from the W-phase coil through IGBT element Q8 to the ground line GL. Similarly, the route of motor current Iv is switched from a route Rt4 extending from the W-phase coil of motor generator MG2 through diode D7 to the power supply line VL to a route Rt13 extending from the W-phase coil through IGBT element Q8 to the ground line GL.

Therefore, in the closed circuit formed between the upper arms of U-phase 15 and V-phase 16 and diode D7 of W-phase 17, the motor current Iw passing through diode D7 is reduced.

Figure 23:
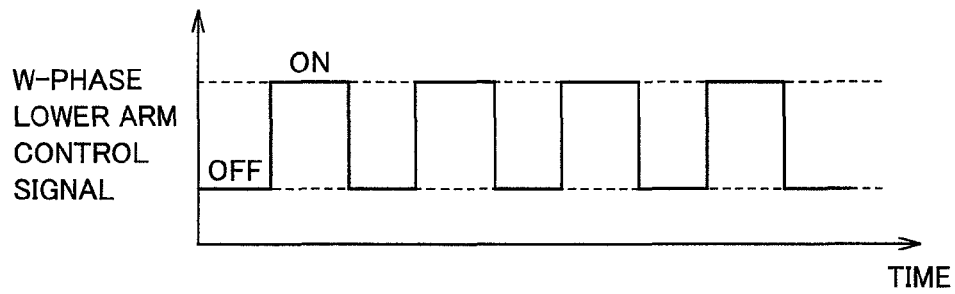
FIG. 23 is a timing chart of control signals for switching a W-phase lower arm as an arm opposite to the upper arms of U- and V-phases.

FIG. 23 is a timing chart of a control signal for realizing the switching operation of lower arm of W-phase 17, as the arm opposite to the upper arms of V-phase 15 and V-phase 16.

As shown in FIG. 23, the lower arm of W-phase 17 is turned on/off at a prescribed duty ratio. As the lower arm of W-phase 17 is turned on/off in this manner, a voltage waveform of rectangular waves that switches between the power supply voltage and the ground voltage with a prescribed duty ratio is induced at the midpoint of W-phase 17. As a result, a continuous AC current flows through motor generator MG2.

As described above, as the motor generator MG2 is driven by the switching operation of the arm opposite to the short-circuited arm or arms, it becomes possible to continuously drive motor generator MG2 while preventing increase of current passing through the normal phase. Therefore, the vehicle mounting the motor drive device can surely run in the limp mode, while protecting inverter 14 from overheating.

After the vehicle enters the limp mode running, to ensure sufficient travel distance, controller 30 controls inverter 14 such that motor generator MG2 is driven with low torque and low rotation number.

At this time, receiving the signal DE from short-circuit portion detecting unit 38A, inverter driving signal converting unit 34 of controller 30 changes the carrier frequency from carrier frequency f1 for the normal operation to carrier frequency f2 for the case of inverter failure detection. Then inverter driving signal converting unit 34 generates the signal DRV2 for switching-control of the opposite arm shown in FIG. 23, using the carrier signal of which carrier frequency has been changed to f2, and outputs the generated signal DRV2 to the IGBT element of the opposite arm.

In FIGS. 23 and 23, an example has been described in which the upper arm of U-phase 15 (IGBT element Q3) and the upper arm of V-phase 16 (IGBT element Q5) are short circuited. As another example, when the upper arm of U-phase 15 (IGBT element Q3) and the lower arm of V-phase 16 (IGBT element Q6) are short circuited, the lower arm of W-phase 17 (IGBT element Q8) as the arm opposite to the upper arm of U-phase 15 and the upper arm of W-phase 17 (IGBT element Q7) as the arm opposite to the lower arm of V-phase 16 (IGBT element Q6) are switching-operated, so as to drive motor generator MG2.

Figure 24:
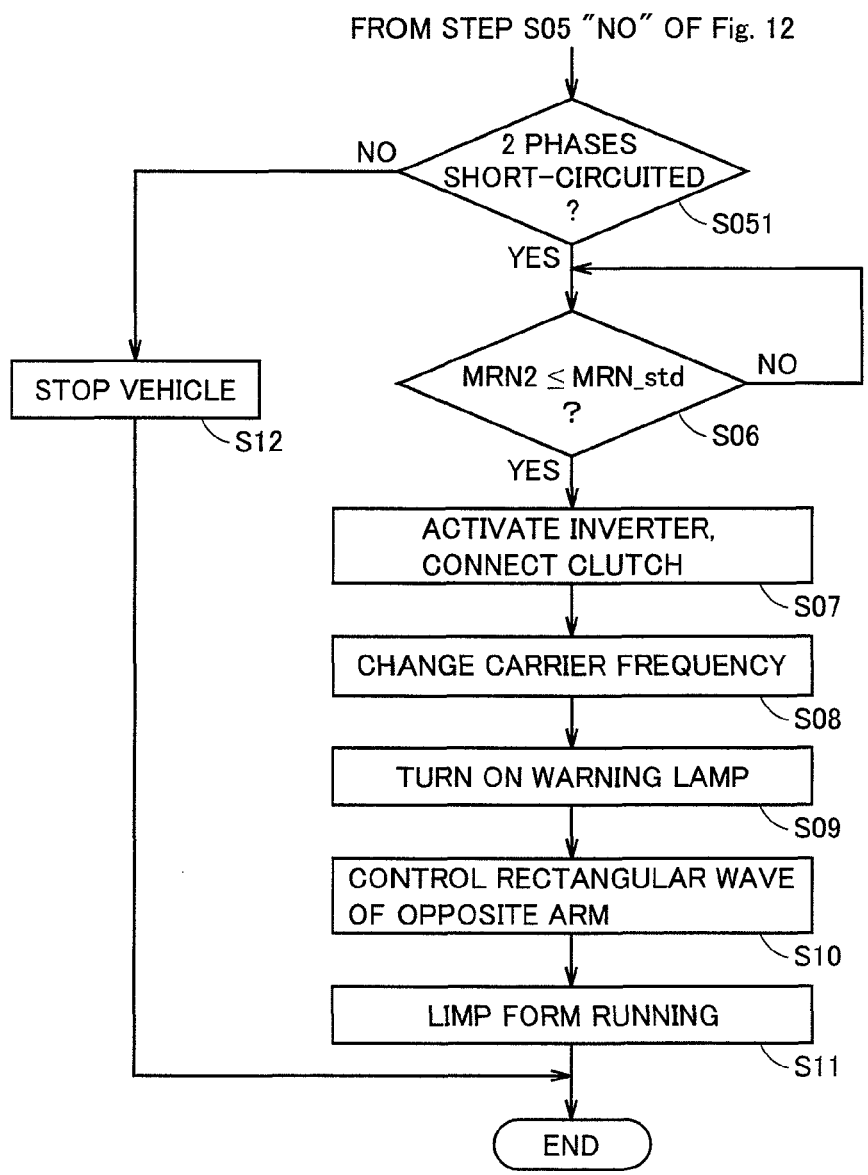
FIG. 24 is a flowchart representing the motor drive control in accordance with Embodiment 3 of the present invention.

FIG. 24 is a flowchart representing the motor drive control in accordance with Embodiment 3 of the present invention. The flowchart shown in FIG. 24 corresponds to the flowchart of FIG. 12, with the vehicle stopping control (step S12), which is executed in response to a determination at step S05 that more than one phase are short-circuited, replaced by steps S051 to S12 of executing motor drive control.

Specifically, referring to FIG. 24, when it is determined that more than one phase are short-circuited by the signal DE from short-circuit portion detecting unit 38A (No at step S05), power transmission control unit 42 and inverter driving signal converting unit 34 determine whether the number of short-circuited phases is two (step S051). If it is determined that two phases are short-circuited, power transmission control unit 42 waits for the motor rotation number MRN2 to attain a prescribe value MRN_std or lower (step S06), and again couples clutch 51 (step S07). Thus, the vehicle enters the limp mode, using motor generator MG2 as a source of driving force.

In response to the determination that only two phases are short-circuited, inverter signal converting unit 34 changes the carrier frequency of the carrier signal from the carrier frequency for normal operation to the carrier frequency for the time of inverter failure detection (step S08).

Further, in the compartment, an alarm lamp is turned on to notify the user that the vehicle entered the limp mode (step S09).

Based on the voltage commands Vu* Vv* and Vw* of the coils of respective phases from motor control phase voltage calculating unit 32 and the carrier signal having the carrier frequency changed to fc, inverter driving signal converting unit 34 generates a signal DRV2 for switching control of the arm of the normal phase opposite to the short-circuited arms, and outputs the generated signal DRV2 to inverter 14 (step S10).

As a result, even after two phases of inverter 14 are short-circuited, drive control of motor generator MG2 is continued, and the vehicle surely runs in the limp mode (step S11).

If it is determined at step S051 that all three phases are short-circuited, coupling of clutch 51 by power transmission control unit 42 is not performed, and the common vehicle stopping control starts (step S12).

As described above, according to Embodiment 3 of the present invention, even when short-circuit failure of a plurality of phases are identified, the arm opposite to the identified short-circuited arms is switching-operated as long as at least one phase is normal, to continue driving of the motor generator. Thus, the vehicle can surely run in the limp mode, while flow of excessive current to the normal phase is prevented. As a result, motor safety and output performance can be ensured when a malfunction of the inverter is detected, with a simple and inexpensive device structure.

Although the present invention has been described and illustrated in detail, it is clearly understood that the same is by way of illustration and example only and is not to be taken by way of limitation, the scope of the present invention being interpreted by the terms of the appended claims.

INDUSTRIAL APPLICABILITY

The present invention may be applicable to a motor drive device for driving a motor coupled to a drive shaft of a vehicle.

The invention claimed is:

1. A motor drive device, comprising:
a three-phase AC motor;
a power source capable of supplying DC power to first and second power supply lines;
a power converting device performing power conversion between said first and second power lines and said three-phase AC motor; and a controller controlling said power converting device such that an output of said three-phase AC motor attains to a target output; wherein said three-phase AC motor has coils of the first to third phases electrically connected, said power converting device includes first to third circuits connected to coils of first to third phases, respectively, of said three-phase AC motor;

each of said first to third circuits has first and second switching elements connected in series a connection node to the coil of respective phase of said three-phase AC motor; and said controller includes a short-circuit detecting unit detecting a switching element failed because of short-circuit, from said first to third circuits, and a motor drive control unit causing, in response to detection of a short-circuited switching element by said short-circuit detecting unit, switching operation of at least one switching element belonging to a circuit different from the circuit to which said short-circuited switching element belongs and arranged, in positional relation, opposite to said short-circuited switching element with said connecting node of each of said first to third circuits interposed, and stopping switching operation of remaining switching element, thereby controlling current flowing through coils of respective phases of said three-phase AC motor.

2. The motor drive device according to claim 1, wherein said motor drive control unit controls, in response to detection of a short-circuit failure of said first switching element of said first circuit, currents flowing through coils of respective phases of said three-phase AC motor by a switching operation of said second switching element of said second and third circuits.

3. The motor drive device according to claim 2, wherein said short-circuit detecting unit detects said short-circuited switching element, based on amplitude of currents flowing through coils of respective phases of said three-phase AC motor.

4. The motor drive device according to claim 3, wherein said short-circuit detecting unit determines that said first switching element of said first circuit is short-circuited, in response to a current flowing through the coil of said first phase of said three-phase AC motor being offset exceeding amplitude of a steady operation of said three-phase AC motor in a direction of a first polarity.

5. The motor drive device according to claim 2, wherein said short-circuit detecting unit detects said short-circuited switching element based on amplitude of an inter-phase voltage of said three-phase AC motor.

6. The motor drive device according to claim 1, wherein said short-circuit detecting unit holds prescribed upper and lower threshold values set in advance based on the amplitude of the inter-phase voltage of said three-phase AC motor in said steady operation state, and detects said short-circuited switching element based on a magnitude relation between the amplitude of the inter-phase voltage of said three-phase AC motor and said upper and lower threshold values.

7. The motor drive device according to claim 2, wherein said short-circuit detecting unit detects said short-circuited switching element, based on a voltage between terminals of said first and second switching elements forming each of said first to third circuits.

8. The motor drive device according to claim 1, wherein said motor drive control unit controls, in response to detection of a short-circuit failure of said first switching element of each of said first and second circuits, currents flowing through coils of respective phases of said three-phase AC motor by a switching operation of said second switching element of said third circuit.

9. The motor drive device according to claim 1, wherein said motor drive control unit controls, in response to detection of a short-circuit failure of said first switching element of said first circuit and of said second switching element of said second circuit, currents flowing through coils of respective phases of said three-phase AC motor by a switching operation of said first and second switching elements of said third circuit.

10. The motor drive device according to claim 1, wherein said three-phase AC motor is coupled to a drive shaft of a vehicle.

* * * * *